(12) United States Patent
Agiwal et al.

(10) Patent No.: US 12,471,172 B2
(45) Date of Patent: Nov. 11, 2025

(54) METHOD FOR HANDLING NON SMALL DATA TRANSMISSION RADIO BEARER DURING SMALL DATA TRANSMISSION AND APPARATUS THEREOF

(71) Applicant: Samsung Electronics Co., Ltd., Suwon-si (KR)

(72) Inventors: Anil Agiwal, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 18/030,421

(22) PCT Filed: Oct. 7, 2021

(86) PCT No.: PCT/KR2021/013824
§ 371 (c)(1),
(2) Date: Apr. 5, 2023

(87) PCT Pub. No.: WO2022/075782
PCT Pub. Date: Apr. 14, 2022

(65) Prior Publication Data
US 2023/0380003 A1    Nov. 23, 2023

(30) Foreign Application Priority Data

Oct. 7, 2020 (KR) .......................... 10-2020-0129196
Feb. 22, 2021 (KR) .......................... 10-2021-0023589

(51) Int. Cl.
*H04W 76/27* (2018.01)
*H04W 12/037* (2021.01)
(Continued)

(52) U.S. Cl.
CPC ......... *H04W 76/27* (2018.02); *H04W 12/037* (2021.01); *H04W 12/106* (2021.01); *H04W 74/0833* (2013.01); *H04W 74/0836* (2024.01)

(58) Field of Classification Search
None
See application file for complete search history.

(56) References Cited

U.S. PATENT DOCUMENTS

2017/0339612 A1* 11/2017 Quan .................... H04W 68/02
2019/0208411 A1*  7/2019 Shrestha ............... H04L 9/3242
(Continued)

FOREIGN PATENT DOCUMENTS

KR  10-2023-0037565 A   3/2023
WO     2020-036753 A1   2/2020
WO     2020/087280 A1   5/2020

OTHER PUBLICATIONS

Author Unknown, Common aspects between RACH and CG-based scheme, Doc. No. R2-2006582, pp. 1-14, Aug. 28, 2020.*
(Continued)

*Primary Examiner* — Christopher M Crutchfield
(74) *Attorney, Agent, or Firm* — Jefferson IP Law, LLP

(57) ABSTRACT

A communication method and system for converging a 5th generation (5G) communication system for supporting higher data rates beyond a 4th generation (4G) system with a technology for Internet of things (IoT) are provided. The communication method and system includes intelligent services based on the 5G communication technology and the IoT-related technology, such as smart home, smart building, smart city, smart car, connected car, health care, digital education, smart retail, security and safety services. A method, a terminal, and a base station for handling non small data transmission (SDT) radio bearer (RB) during SDT in a wireless communication system are provided.

15 Claims, 10 Drawing Sheets

(51) Int. Cl.
  *H04W 12/106* (2021.01)
  *H04W 74/0833* (2024.01)
  *H04W 74/0836* (2024.01)

(56) References Cited

U.S. PATENT DOCUMENTS

| | | |
|---|---|---|
| 2020/0053791 A1 | 2/2020 | Ozturk et al. |
| 2021/0337602 A1 | 10/2021 | Liu et al. |
| 2022/0095396 A1* | 3/2022 | Luo ................. H04W 76/12 |
| 2022/0095410 A1* | 3/2022 | Shih ............... H04W 74/0833 |
| 2024/0015689 A1* | 1/2024 | Tseng ............... H04W 4/029 |

OTHER PUBLICATIONS

Author Unknown, The Conditions for Small Data Transmission in Inactive State, Doc. No. R2-2006837, pp. 1-2, Aug. 2020.*
OPPO, Procedure of Small Data Transmission, R2-2006836, 3GPP TSG-RAN WG2 #111-e, E-meeting, Aug. 7, 2020.
Interdigital, RACH-based UL small data transmission procedure, R2-2007613, 3GPP TSG RAN WG2 #111-e, Aug. 7, 2020.
Intel Corporation, Radio bearer configuration for SDT considering UE context relocation and CU /DU split, R2-2006714, 3GPP TSG RAN WG2 #111-e, Aug. 7, 2020.
Samsung, Random access based small data transmission—details, R2-2006773, 3GPP TSG RAN WG2 #111-e, Aug. 6, 2020.
Samsung, Control plane aspects of SDT, R2-2009095, 3GPP TSG RAN2 Meeting #112-e, Oct. 23, 2020.
Ericsson, Details of solution B for small data transmission in RRC Inactive, R2-1700890, 3GPP TSG-RAN WG2 #97, Athens, Greece, Feb. 12, 2017, XP051211669.
VIVO, General Considerations on Small Data Transmission, R2-2006550, 3GPP TSG-RAN WG2 Meeting#111-electronic, E-Meeting, Aug. 7, 2020, XP051911495.
Session Chair (Interdigital), Report for Rel-16 (NR-U, Power Savings and 2-step RACH) and Rel-17 (IIoT and Small Data), R2-2008124, 3GPP TSG-RAN WG2 Meeting #111-e, Electronic, Sep. 1, 2020, XP052361232.
Extended European Search Report dated Jan. 30, 2024, issued in European Patent Application No. 21878032.8.
Korean Office Action dated Jun. 11, 2025, issued in Korean Patent Application No. 10-2023-7011742.

* cited by examiner

METHOD FOR HANDLING NON SMALL DATA TRANSMISSION RADIO BEARER DURING SMALL DATA TRANSMISSION AND APPARATUS THEREOF

CROSS-REFERENCE TO RELATED APPLICATION(S)

This application is a U.S. National Stage application under 35 U.S.C. § 371 of an International application number PCT/KR2021/013824, filed on Oct. 7, 2021, which is based on and claims priority of a Korean patent application number 10-2020-0129196, filed on Oct. 7, 2020, in the Korean Intellectual Property Office, and of a Korean patent application number 10-2021-0023589, filed on Feb. 22, 2021, in the Korean Intellectual Property Office, the disclosure of each of which is incorporated by reference herein in its entirety.

TECHNICAL FIELD

The disclosure relates to methods and apparatuses in a wireless communication system. More particularly, the disclosure relates to handing non-small data transmission (SDT) radio bearer (RB) during SDT.

BACKGROUND ART

To meet the demand for wireless data traffic which has increased since deployment of 4th generation (4G) communication systems, efforts have been made to develop an improved 5th generation (5G) or pre-5G communication system. Therefore, the 5G or pre-5G communication system is also referred to as a 'beyond 4G network' or a 'post long-term evolution (LTE) System.' The 5G wireless communication system supports not only lower frequency bands, but also higher frequency (millimeter (mm) Wave) bands, e.g., 10 gigahertz (GHz) to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving into an internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth, have been recently researched. Such an IoT environment may provide intelligent Internet technology services that create new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. The third generation (3G) wireless communication system supports the voice service and data service. The 4G wireless communication system has been developed to provide high-speed data service. However, the 4G wireless communication system currently suffers from a lack of resources to meet the growing demand for high speed data services. Therefore, the 5G wireless communication system (also referred as next generation radio or new radio (NR)) is being developed to meet the growing demand of various services with diverse requirements, e.g., high-speed data services, support ultra-reliability and low-latency applications.

In addition, the 5G wireless communication system is expected to address different use cases having different requirements in terms of data rate, latency, reliability, mobility, etc. However, it is expected that the design of the air-interface of the 5G wireless communication system will be flexible enough to serve user equipments (UEs) having different capabilities depending on the use case and market segment in which a UE caters service to the end customer. Use cases that the 5G wireless communication system is expected to address include enhanced Mobile Broadband (eMBB), massive machine type communication (m-MTC), ultra-reliable low-latency communication (URLL), etc. The eMBB requirements (e.g., tens of gigabits per second (Gbps) data rate, low-latency, high-mobility, and so on) address the market segment representing the wireless broadband subscribers needing internet connectivity everywhere, all the time, and on the go. The m-MTC requirements (e.g., very high connection density, infrequent data transmission, very long battery life, low mobility address, and so on) address the market segment representing the IoT/IoE envisioning connectivity of billions of devices. The URLL requirements (e.g., very low latency, very high reliability, variable mobility, and so forth) address the market segment representing the industrial automation application and vehicle-to-vehicle/ vehicle-to-infrastructure communication that is foreseen as one of the enablers for autonomous cars.

The 5G wireless communication system supports a stand-alone mode of operation as well as dual connectivity (DC). In DC, a multiple receive (Rx)/transmit (Tx) UE may be configured to utilize resources provided by two different nodes (or node Bs (NBs)) connected via a non-ideal backhaul. One node acts as a master node (MN) and the other node acts as a secondary node (SN). The MN and SN are connected via a network interface and at least the MN is connected to the core network. NR also supports multi-radio access technology (RAT) DC (MR-DC) operation whereby a UE in radio resource control (RRC) CONNECTED is configured to utilize radio resources provided by two distinct schedulers, located in two different nodes connected via a non-ideal backhaul and providing either evolved universal mobile telecommunications system (UMTS) terrestrial radio access (E-UTRA) (i.e., if the node is a new generation-evolved node B (ng-eNB)) or NR access (i.e., if the node is a next generation node B (gNB)).

In NR, for a UE in RRC_CONNECTED not configured with carrier aggregation (CA)/DC, there is only one serving cell, comprising the primary cell (PCell). For a UE in RRC_CONNECTED configured with CA/DC, the term 'serving cells' is used to denote the set of cells comprising the special cell(s) (SpCell(s)) and all secondary cells (SCells).

In NR, the term 'master cell group (MCG)' refers to a group of serving cells associated with the MN, comprising the PCell and optionally one or more SCells. In NR, the term 'secondary cell group (SCG)' refers to a group of serving cells associated with the SN, comprising the primary SCG cell (PSCell) and optionally one or more SCells. In NR, PCell refers to a serving cell in MCG, operating on the primary frequency, in which the UE either performs the initial connection establishment procedure or initiates the connection re-establishment procedure. In NR, for a UE configured with CA, an SCell is a cell providing additional radio resources on top of an SpCell. PSCell refers to a serving cell in SCG in which the UE performs random access (RA) when performing the reconfiguration with synchronization procedure. For DC operation, the term 'SpCell' refers to the PCell of the MCG or the PSCell of the SCG; otherwise, the term 'SpCell' refers to the PCell.

In the 5G wireless communication system, RA is supported. RA is used to achieve uplink (UL) time synchronization. RA is used during initial access, handover, RRC connection re-establishment procedures, scheduling request transmissions, small data transmission, SI request, secondary cell group (SCG) addition/modification, beam failure recovery (BFR), and data or control information transmission in UL by a non-synchronized user equipment (UE) in an RRC_CONNECTED state. Several types of RA procedures are supported. The RA configuration (e.g., preambles, PRACH occasions, etc.) for performing RA procedure is configured separately for each BWP.

Contention Based RA (CBRA):

This is also referred to as 4 step CBRA. In this type of RA, the UE first transmits an RA preamble (also referred to as message 1 (Msg1)), and then waits for a random access response (RAR) in the RAR window. The RAR is also referred to as message 2 (Msg2). Next generation node B (gNB) transmits the RAR on the physical downlink shared channel (PDSCH). A PDCCH scheduling the PDSCH carrying the RAR is addressed to an RA-radio network temporary identifier (RA-RNTI). The RA-RNTI identifies the time-frequency resource (also referred to as a physical RA channel (PRACH) occasion or a PRACH transmission (TX) occasion or an RA channel (RACH) occasion) in which the RA preamble was detected by the gNB. The RA-RNTI is calculated as follows:

$$RA\text{-}RNTI = 1 + s\_id + 14*t\_id + 14*80*f\_id + 14*80*8*ul\_carrier\_id,$$

where s_id is the index of the first orthogonal frequency division multiplexing (OFDM) symbol of the PRACH occasion, where the UE has transmitted Msg1, i.e., the RA preamble; $0 \leq s\_id < 14$; t_id is the index of the first slot of the PRACH occasion ($0 \leq t\_id < 80$); f_id is the index of the PRACH occasion within the slot in the frequency domain ($0 \leq f\_id < 8$); and ul_carrier_id is the UL carrier used for Msg1 transmission (0 for normal UL (NUL) carrier and 1 for supplementary UL (SUL) carrier. Several RARs for various RA preambles detected by the gNB can be multiplexed in the same RAR media access control (MAC) protocol data unit (PDU) by the gNB. An RAR in a MAC PDU corresponds to a UE's RA preamble transmission if the RAR includes an RA preamble identifier (RAPID) of the RA preamble transmitted by the UE. If the RAR corresponding to its RA preamble transmission is not received during the RAR window and the UE has not yet transmitted the RA preamble for a configurable (e.g., configured by the gNB in a RACH configuration) number of times, the UE returns to the first step, i.e., selects an RA resource (preamble/PRACH occasion) and transmits the RA preamble. A backoff may be applied before returning to the first step.

If the RAR corresponding to the RA preamble transmission is received, the UE transmits a message 3 (Msg3) in a UL grant received in RAR. Msg3 includes a message such as an RRC connection request, an RRC connection re-establishment request, an RRC handover confirm, a scheduling request, an SI request, etc. Msg3 may include the UE identity (i.e., a cell-radio network temporary identifier (C-RNTI), a system architecture evolution (SAE)-temporary mobile subscriber identity (S-TMSI), or a random number). After transmitting the Msg3, the UE starts a contention resolution timer. While the contention resolution timer is running, if the UE receives a physical downlink control channel (PDCCH) addressed to the C-RNTI included in Msg3, contention resolution is considered successful, a contention resolution timer is stopped, and the RA procedure is completed. While the contention resolution timer is running, if the UE receives a contention resolution MAC control element (CE) including the UE's contention resolution identity (e.g., the first X bits of a common control channel (CCCH) service data unit (SDU) transmitted in Msg3), contention resolution is considered successful, the contention resolution timer is stopped, and the RA procedure is completed. If the contention resolution timer expires and the UE has not yet transmitted the RA preamble for a configurable number of times, the UE returns to the first step, i.e., selects an RA resource (preamble/PRACH occasion) and transmits the RA preamble. A backoff may be applied before returning to the first step.

Contention free RA (CFRA): This is also referred to as legacy CFRA or 4 step CFRA. A CFRA procedure is used for scenarios such as handover where low latency is required, timing advance establishment for SCell, etc. An evolved node B (eNB) (or gNB) assigns to the UE a dedicated RA preamble. The UE transmits the dedicated RA preamble. The eNB (or gNB) transmits the RAR on a PDSCH addressed to RA-RNTI. The RAR conveys an RA preamble identifier and timing alignment information. The RAR may also include a UL grant. The RAR is transmitted in an RAR window similar to a CBRA procedure. CFRA is considered successfully completed after receiving the RAR including an RAPID of the RA preamble transmitted by the UE. In case RA is initiated for BFR, CFRA is considered successfully completed if PDCCH addressed to C-RNTI is received in a search space for BFR. If the RAR window expires and RA is not successfully completed and the UE has not yet transmitted the RA preamble for a configurable (i.e., configured by the gNB in a RACH configuration) number of times, the UE retransmits the RA preamble.

For certain events such as handover and BFR, if dedicated preamble(s) are assigned to the UE, during the first step of RA procedure, i.e., during RA resource selection for Msg1 transmission, the UE determines whether to transmit the dedicated preamble or a non-dedicated preamble. Dedicated preambles are typically provided for a subset of synchronization signal and physical broadcast channel (PBCH) blocks (SSBs)/channel state information reference signals (CSI-RSs). If there is no SSB/CSI-RS having DL reference signal received power (RSRP) above a threshold among the SSBs/CSI-RSs for which CFRA resources (i.e., dedicated preambles/PRACH occasions) are provided by the gNB, the UE selects a non-dedicated preamble. Otherwise, the UE selects the dedicated preamble. During the RA procedure, one RA attempt may be CFRA while another RA attempt may be CBRA.

2 step CBRA: In the first step of 2 step CBRA, the UE transmits an RA preamble on a PRACH and a payload (i.e., MAC PDU) on a physical uplink shared channel (PUSCH). The RA preamble and payload transmission is also referred to as message A (MsgA). In the second step, after MsgA transmission, the UE monitors for a response from the network (i.e., from the gNB) within a configured window. The response is also referred to as message B (MsgB). If a CCCH SDU was transmitted in the MsgA payload, the UE performs contention resolution using the contention resolution information in MsgB. The contention resolution is successful if the contention resolution identity received in MsgB matches the first 48 bits of the CCCH SDU transmitted in MsgA. If a C-RNTI was transmitted in the MsgA payload, the contention resolution is successful if the UE receives a PDCCH addressed to the C-RNTI. If contention resolution is successful, the RA procedure is considered successfully completed. Instead of contention resolution information corresponding to the transmitted MsgA, MsgB may include fallback information corresponding to the RA preamble transmitted in MsgA. If the fallback information is received, the UE transmits Msg3 and performs contention resolution using Msg4 as in the CBRA procedure. If contention resolution is successful, the RA procedure is considered successfully completed. If contention resolution fails upon fallback (i.e., upon transmitting Msg3), the UE retransmits MsgA. If a configured window in which the UE monitors a network response after transmitting MsgA expires and the UE has not received MsgB including contention resolution information or fallback information as explained above, the UE retransmits MsgA. If the RA procedure is not successfully completed after transmitting MsgA a configurable number of times, the UE fallbacks to the 4 step RA procedure, i.e., the UE only transmits the RA preamble.

An MsgA payload may include one or more of CCCH SDU, a dedicated control channel (DCCH) SDU, a dedicated traffic channel (DTCH) SDU, a buffer status report (BSR) MAC CE, a power headroom report (PHR) MAC CE, SSB information, a C-RNTI MAC CE, or padding. MsgA may include a UE ID (e.g., random ID, S-TMSI, C-RNTI, resume ID, etc.) along with a preamble in the first step. The UE ID may be included in the MAC PDU of MsgA. A UE ID such as C-RNTI may be carried in a MAC CE, wherein the MAC CE is included in a MAC PDU. Other UE IDs (such as random ID, S-TMSI, C-RNTI, resume ID, etc.) may be carried in CCCH SDU. The UE ID can be one of a random ID, S-TMSI, C-RNTI, resume ID, international mobile subscriber identity (IMSI), idle mode ID, inactive mode ID, etc. The UE ID can be different in different scenarios in which the UE performs the RA procedure. When the UE performs RA after power on (e.g., before it is attached to the network), then the UE ID is the random ID. When the UE performs RA in an IDLE state after the UE is attached to network, the UE ID is S-TMSI. If the UE has an assigned C-RNTI (e.g., in a connected state), the UE ID is C-RNTI. In case the UE is in an INACTIVE state, the UE ID is a resume ID. In addition to the UE ID, some additional control information can be sent in MsgA. The control information may be included in the MAC PDU of the MsgA. The control information may include one or more of a connection request indication, a connection resume request indication, an SI request indication, a buffer status indication, beam information (e.g., one or more DL TX beam ID(s) or SSB ID(s)), BFR indication/information, a data indicator, a cell/base station (BS)/transmit-receive point (TRP) switching indication, a connection re-establishment indication, a reconfiguration complete or handover complete message, etc.

2 step CFRA: In this case, the gNB assigns to the UE a dedicated RA preamble(s) and PUSCH resource(s) for MsgA transmission. PRACH occasion(s) to be used for preamble transmission may also be indicated. In the first step of 2 step CFRA, the UE transmits the RA preamble on a PRACH and a payload on a PUSCH using the CFRA resources (i.e., a dedicated preamble/PUSCH resource/PRACH occasion). In the second step of 2 step CFRA, after MsgA transmission, the UE monitors for a response from the network (i.e., the gNB) within a configured window. If the UE receives a PDCCH addressed to the C-RNTI, the RA procedure is considered successfully completed. If the UE receives fallback information corresponding to the transmitted preamble, the RA procedure is considered successfully completed.

For certain events such as handover and BFR, if a dedicated preamble(s) and PUSCH resource(s) are assigned to the UE, during the first step of RA procedure, i.e., during RA resource selection for MsgA transmission, the UE determines whether to transmit the dedicated preamble or a non dedicated preamble. Dedicated preambles are typically provided for a subset of SSBs/CSI-RSs. If there is no SSB/CSI-RS having a DL RSRP above a threshold among the SSBs/CSI-RSs for which CFRA resources (i.e., dedicated preambles/PRACH occasions/PUSCH resources) are provided by the gNB, the UE selects a non dedicated preamble. Otherwise, the UE selects the dedicated preamble. During the RA procedure, one RA attempt may be 2 step CFRA, while another RA attempt may be 2 step CBRA.

Upon initiation of an RA procedure, the UE first selects the carrier (i.e., an SUL or NUL). If the carrier to use for the RA procedure is explicitly signaled by the gNB, the UE selects the signaled carrier for performing the RA procedure. If the carrier to use for the RA procedure is not explicitly signaled by the gNB; and if the serving cell for the RA procedure is configured with the SUL; and if the RSRP of the DL pathloss reference is less than rsrp-ThresholdSSB-SUL: then the UE selects the SUL carrier for performing RA procedure. Otherwise, the UE selects the NUL carrier for performing the RA procedure. Upon selecting the UL carrier, the UE determines the UL and DL BWP for RA procedure as specified in section 5.15 of technical specification (TS) 38.321. The UE then determines whether to perform 2 step or 4 step RA for this RA procedure.

If this RA procedure is initiated by a PDCCH order and if the ra-PreambleIndex explicitly provided by PDCCH is not 0b000000, the UE selects 4 step RA procedure.

Else if 2 step CFRA resources are signaled by the gNB for this RA procedure, the UE selects 2 step RA procedure.

Else if 4 step CFRA resources are signaled by the gNB for this RA procedure, the UE selects 4 step RA procedure.

Else if the UL BWP selected for this RA procedure is configured with only 2 step RA resources, the UE selects 2 step RA procedure.

Else if the UL BWP selected for this RA procedure is configured with only 4 step RA resources, the UE selects 4 step RA procedure.

Else if the UL BWP selected for this RA procedure is configured with both 2 step and 4 step RA resources and RSRP of the DL pathloss reference is below a configured threshold, the UE selects 4 step RA procedure. Otherwise, the UE selects 2 step RA procedure.

In the 5G wireless communication system, node B (gNB) or base station in cell broadcasts SSB including primary and secondary synchronization signals (PSS, SSS) and SI. SI includes common parameters needed to communicate in cell. In the 5G wireless communication system (also referred as next generation radio or NR), SI is divided into the master information block (MIB) and a number of second information blocks (SIBs) where:

the MIB is always transmitted on the broadcast channel (BCH) with a periodicity of 80 milliseconds (ms) and repetitions made within 80 ms, and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms, but the actual transmission repetition periodicity is up to network implementation. The scheduling information in SIB1 includes mapping between SIBs and SI messages, periodicity of each SI message and SI window length. The scheduling information in SIB1 includes an indicator for each SI message, which indicates whether the concerned SI message is being broadcasted or not. If at least one SI message is not being broadcasted, SIB1 may include RA resources (PRACH preamble(s) and PRACH resource(s)) for requesting gNB to broadcast one or more SI message(s).

In the 5G wireless communication system, the UE can be in one of the following RRC states: RRC_IDLE, RRC_INACTIVE, and RRC_CONNECTED. A UE is either in RRC_CONNECTED state or in RRC_INACTIVE state when an RRC connection has been established. If this is not the case, i.e., no RRC connection is established, the UE is in RRC_IDLE state. The RRC states can further be characterized as follows:

In RRC_IDLE state, a UE specific discontinuous reception (DRX) may be configured by upper layers (i.e., non-access stratum (NAS)). The UE monitors short messages transmitted with paging-radio network temporary identity (P-RNTI) over downlink control information (DCI), monitors a paging channel for core network (CN) paging using 5G-system architecture evolution (SAE)-temporary mobile subscriber identity (5G-S-TMSI), performs neighboring cell measurements and cell selection or re-selection, acquires SI, can send SI request (if configured), and performs logging of available measurements together with location and time for logged measurement configured UEs.

In RRC_INACTIVE state, a UE specific DRX may be configured by upper layers or by RRC layer. In this state, the UE stores the UE inactive access stratum (AS) context. A RAN-based notification area is configured by RRC layer. The UE monitors short messages transmitted with P-RNTI over DCI, monitors a paging channel for CN paging using 5G-S-TMSI and RAN paging using full inactive-RNTI (I-RNTI), performs neighboring cell measurements and cell selection or re-selection, performs RAN-based notification area updates periodically and when moving outside the configured RAN-based notification area, acquires SI, can send SI request (if configured), and performs logging of available measurements together with location and time for logged measurement configured UEs.

In the RRC_CONNECTED state, the UE stores the AS context. Unicast data is transmitted/received to/from the UE. The UE monitors short messages transmitted with P-RNTI over DCI, if configured, monitors control channels associated with the shared data channel to determine if data is scheduled for it, provides channel quality and feedback information, performs neighboring cell measurements and measurement reporting, and acquires SI.

In the RRC_CONNECTED state, network may initiate suspension of the RRC connection by sending RRCRelease with suspend configuration. When the RRC connection is suspended, UE may reset MAC and release the default MAC cell group configuration, if any; may re-establish radio link control (RLC) entities for signaling radio bearer 1 (SRB1); may suspend all SRB(s) and data radio bearers (DRB(s)), except signaling radio bearer 0 (SRB0); may indicate packet data convergence protocol (PDCP) suspend to lower layers of all DRBs; may store in the UE inactive AS context the current $K_{gNB}$ (gNB specific security key from which security keys for integrity protection and encryption are derived) and $K_{RRCint}$ (security key for integrity protection of RRC messages) keys, the robust header compression (ROHC) state, the stored quality of service (QoS) flow to DRB mapping rules, the C-RNTI used in the source PCell, the cellIdentity and the physical cell identity of the source PCell, the spCellConfigCommon within ReconfigurationWithSync of the NR PS Cell (if configured) and all other parameters configured except for: parameters within ReconfigurationWithSync of the PCell; parameters within ReconfigurationWithSync of the NR PSCell, if configured; parameters within MobilityControlInfoSCG of the E-UTRA PSCell, if configured; servingCellConfigCommonSIB; and the UE stores the UE inactive AS context and any configuration received from the network, and transits to RRC_INACTIVE state.

If the UE is configured with SCG, the UE releases the SCG configuration upon initiating a RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform a RAN notification area (RNA) update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes SRB(s) and DRB(s). In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate NAS level recovery (in this case the network sends an RRC setup message).

Upon initiating the connection resume procedure, UE may: apply the default layer 1 (L1 or physical layer) parameter values as specified in corresponding physical layer specifications, except for the parameters for which values are provided in SIB1; apply the default MAC Cell Group configuration; apply the CCCH configuration; start timer T319; apply the timeAlignmentTimerCommon included in SIB1; apply the default SRB1 configuration; set the variable pendingRNA-Update to false; initiate transmission of the RRCResumeRequest message or RRCResumeRequest1; restore the RRC configuration, RoHC state, the stored QoS flow to DRB mapping rules and the $K_{gNB}$ and $K_{RRCint}$ keys from the stored UE Inactive AS context except for the following: masterCellGroup; mrdc-S econdaryCellGroup, if stored; and pdcp-Config; set the resumeMAC-I to the 16 least significant bits of the MAC-I calculated: with the $K_{RRCint}$ key in the UE Inactive AS Context and the previously configured integrity protection algorithm; and with all input bits for COUNT, BEARER and DIRECTION set to binary ones and message set to VarResumeMAC-Input (source physical cell ID (PCI), i.e., PCI in stored AS context, target Cell-ID, i.e., cellIdentity of the first PLMN-Identity included in the PLMN-IdentityInfoList broadcasted in SIB1 of the cell to which UE is sending resume request, source C-RNTI, i.e., C-RNTI in stored AS context); derive the $K_{gNB}$ key based on the current $K_{gNB}$ key or the next hop (NH) in the UE inactive AS Context, using the stored nextHopChainingCount value; derive the $K_{RRCenc}$ key, the $K_{RRCint}$ key, the $K_{UPint}$ key and the $K_{UPenc}$ key; configure lower layers to apply integrity protection for all signaling radio bearers except SRB0 using the configured algorithm and the $K_{RRCint}$ key and $K_{UPint}$ key, i.e., integrity protection shall be applied to all subsequent messages received and sent by the UE; configure lower layers to apply ciphering for all signaling radio bearers except SRB0 and to apply the configured ciphering algorithm, the $K_{RRCenc}$ key and the $K_{UPenc}$ key, i.e., the ciphering configuration shall be applied to all subsequent messages received and sent by the UE; re-establish PDCP entities for SRB1; resume SRB1; and transmit RRCResumeRequest or RRCResumeRequest1. If field useFullResumeID is signaled in SIB1: UE may select RRCResumeRequest1 as the message to use; may set the resumeIdentity to the stored fullI-RNTI value. If field useFullResumeID is not signaled in SIB1: UE may select RCResumeRequest as the message to use; and may set the resumeIdentity to the stored shortI-RNTI value. The RRCResumeRequest or RRCResumeRequest1 is transmitted on SRB0. The logical channel for RRCResumeRequest is CCCH (or CCCH0), i.e., in MAC PDU, logical channel ID (LCID) corresponding to CCCH is added in MAC subheader of MAC SDU carrying RRCResumeReqeust. The logical channel for RRCResumeRequest1 is CCCH1, i.e., in MAC PDU, LCID corresponding to CCCH is added in MAC subheader of MAC SDU carrying RRCResumeReqeust. RLC transparent mode (i.e., no RLC header is added to RRC message) is used for transmitting RRCResumeRequest or RRCResumeRequest1 message. In 5G wireless communication system, small data transmission (SDT) in RRC_INACTIVE is supported. The uplink data can be transmitted in Msg3 in case of 4 step RA procedure and in MsgA in case of 2 step RA procedure.

Issue:

Small data transmission is configured by the network on a per DRB (or RB) basis. The SDT procedure is initiated by UE in RRC_INACTIVE when data arrives only for DRB(s) (or RB(s)) for which SDT is configured.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

It is possible that data for non small data transmission (SDT) data radio bearer (DRB) (or radio bearer (RB)) is not available at the time of initiation of SDT procedure. However, data for non SDT DRB (or RB) may become available while the SDT procedure is ongoing. Method is needed to handle arrival of non SDT DRB (or RB) data while SDT procedure is ongoing.

Solution to Problem

Aspects of the disclosure are to address at least the above-mentioned problems and/or disadvantages and to provide at least the advantages described below. Accordingly, an aspect of the disclosure is to provide a communication method and system for converging a 5th generation (5G) communication system for supporting higher data rates beyond a 4th generation (4G) system.

In accordance with an aspect of the disclosure, a method performed by a terminal in a wireless communication system is provided. The method includes initiating a small data transmission (SDT) procedure based on data arriving for an SDT radio bearer (RB) for which SDT is configured, while the SDT procedure is ongoing, identifying that data become available for a logical channel of a non SDT RB for which the SDT is not configured, transmitting, to a base station, a first indication that the data for the non SDT RB are available, and in response to the first indication, receiving, from the base station, a radio resource control (RRC) resume message or a second indication to consider the non SDT RB as the SDT RB.

In accordance with another aspect of the disclosure, a method performed by a base station in a wireless communication system is provided. The method includes receiving a random access preamble for SDT from a terminal, the random access preamble initiating an SDT procedure based on data arriving for an SDT RB for which SDT is configured, while the SDT procedure is ongoing, receiving a first indication from the terminal that data become available for a logical channel of a non SDT RB for which the SDT is not configured, and in response to the first indication, transmitting, to the terminal, a RRC resume message or a second indication to consider the non SDT RB as the SDT RB.

In accordance with another aspect of the disclosure, a terminal in a wireless communication system including a transceiver and a controller is provided. The controller is configured to initiate a SDT procedure based on data arriving for an SDT RB for which SDT is configured, while the SDT procedure is ongoing, identify that data become available for a logical channel of a non SDT RB for which the SDT is not configured, transmit, to a base station via the transceiver, a first indication that the data for the non SDT RB are available, and in response to the first indication, receive, from the base station via the transceiver, a RRC resume message or a second indication to consider the non SDT RB as the SDT RB.

In accordance with another aspect of the disclosure, a base station in a wireless communication system including a transceiver and a controller is provided. The controller is configured to receive, from a terminal via the transceiver, a random access preamble for SDT, the random access preamble initiating an SDT procedure based on data arriving for an SDT RB for which SDT is configured, while the SDT procedure is ongoing, receive, from the terminal via the transceiver, a first indication that data become available for a logical channel of a non SDT RB for which the SDT is not configured, and in response to the first indication, transmit, to the terminal via the transceiver, a RRC resume message or a second indication to consider the non SDT RB as the SDT RB.

Additional aspects will be set forth in part in the description which follows and, in part, will be apparent from the description, or may be learned by practice of the presented embodiments.

Advantageous Effects of Invention

One of the advantages of proposed operations is that data transmission of non small data transmission (SDT) radio bearer is not delayed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR THE INVENTION

Figure 1:
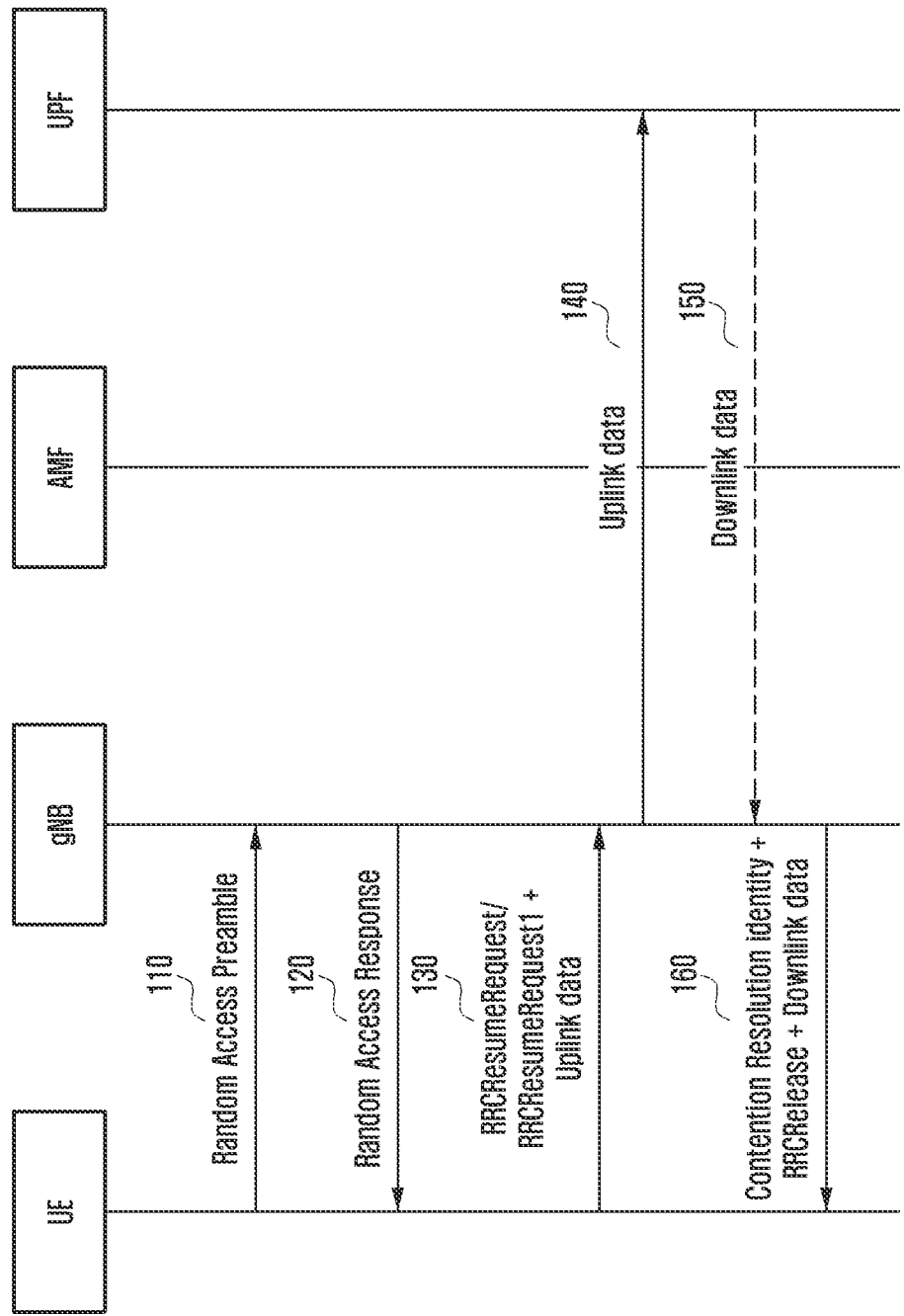
FIG. 1 is an example signaling flow for small data transmission (SDT) using 4 step random access (RA)

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect that the characteristic was intended to provide.

It is known to those skilled in the art that blocks of a flowchart (or sequence diagram) and a combination of flowcharts may be represented and executed by non-transitory computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module," or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to providing the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

In 5G wireless communication system, small data transmission (SDT) in RRC_INACTIVE is supported. The uplink (UL) data can be transmitted in message 3 (Msg3) in case of 4 step random access (RA) procedure and in message A (MsgA) in case of 2 step RA procedure.

FIG. 1 is an example signaling flow for small data transmission using 4 step RA.

1. When criteria to initiate 4 step RA for SDT is met, UE selects preamble/RA occasion (RO) from preambles/ROs for SDT. UE transmits random access preamble at operation 110 and receives RA response (RAR) including UL grant for Msg3 transmission at operation 120.

The UE sends an RRCResumeRequest/RRCResumeRequest1 to the gNB (same as the last serving gNB) on signaling radio bearer (SRB) 0 at operation 130. It includes full/short inactive-radio network temporary identifier (I-RNTI) (resumeIdentity), the resume cause (resume-Cause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token. The UE shall calculate it using the integrity algorithm (integrity algorithm for 5G (NIA) or evolved packet system (EPS) integrity algorithm (EIA)) in the stored access stratum (AS) security context, which was negotiated between the UE and the last serving gNB and the $K_{RRCint}$ from the stored AS security context with the following inputs:

KEY: it shall be set to current $K_{RRCint}$;
BEARER: all its bits shall be set to 1;
DIRECTION: its bit shall be set to 1;
COUNT: all its bits shall be set to 1; and
MESSAGE: it shall be set to VarResumeMAC-Input with following inputs:
source PCI (set to the physical cell identity of the PCell the UE was connected to prior to suspension of the radio resource control (RRC) connection or the primary cell (PCell) from which UE has previously received RRCRelease with suspend configuration);
target Cell-ID (set to the cellIdentity of the first PLMN-Identity included in the PLMN-IdentityInfoList broadcasted in SIB1 of the target cell, i.e., the cell to which the UE is sending small data); and
source C-RNTI (set to cell-RNTI (C-RNTI) that the UE had in the PCell it was connected to prior to suspension of the RRC connection or it was communicating to prior to reception of RRCRelease with suspend configuration).

The UE resumes SRB1. UE resumes SRB2 if SDT is allowed/configured/enabled for SRB2 and UE resumes data radio bearer(s) (DRB(s)) for which SDT is allowed/configured/enabled, derives new security keys using the NextHopChainingCount provided in the last received RRCRelease message and re-establishes the AS security. The user data are ciphered and integrity protected (only for DRBs configured with user plane (UP) integrity protection) and transmitted on dedicated traffic channel (DTCH) multiplexed with the RRCResumeRequest/RRCResumeRequest1 message on common control channel (CCCH)/CCCH1.

2. The gNB validates the resumeMAC-I and delivers the uplink data to UP function (UPF) at operation 140. Optionally, the gNB receives downlink data from UPF at operation 150.

3. The gNB sends the RRCRelease message with suspend configuration to keep the UE in RRC_INACTIVE along with a contention Resolution Identity at operation 160. Physical downlink control channel (PDCCH) is addressed to temporary cell-RNTI (TC-RNTI). If downlink data is available, they are sent ciphered and integrity protected (only for DRBs configured with UP integrity protection) on DTCH multiplexed with the RRCRelease message on dedicated control channel (DCCH). gNB may decide not to send the RRCRelease message together with contention Resolution Identity. In this case upon completion of random access, UE monitors PDCCH addressed to C-RNTI. UL/DL data can be exchanged between UE and gNB until RRCRelease message with suspend configuration is received or SDT procedure is terminated.

Figure 2:
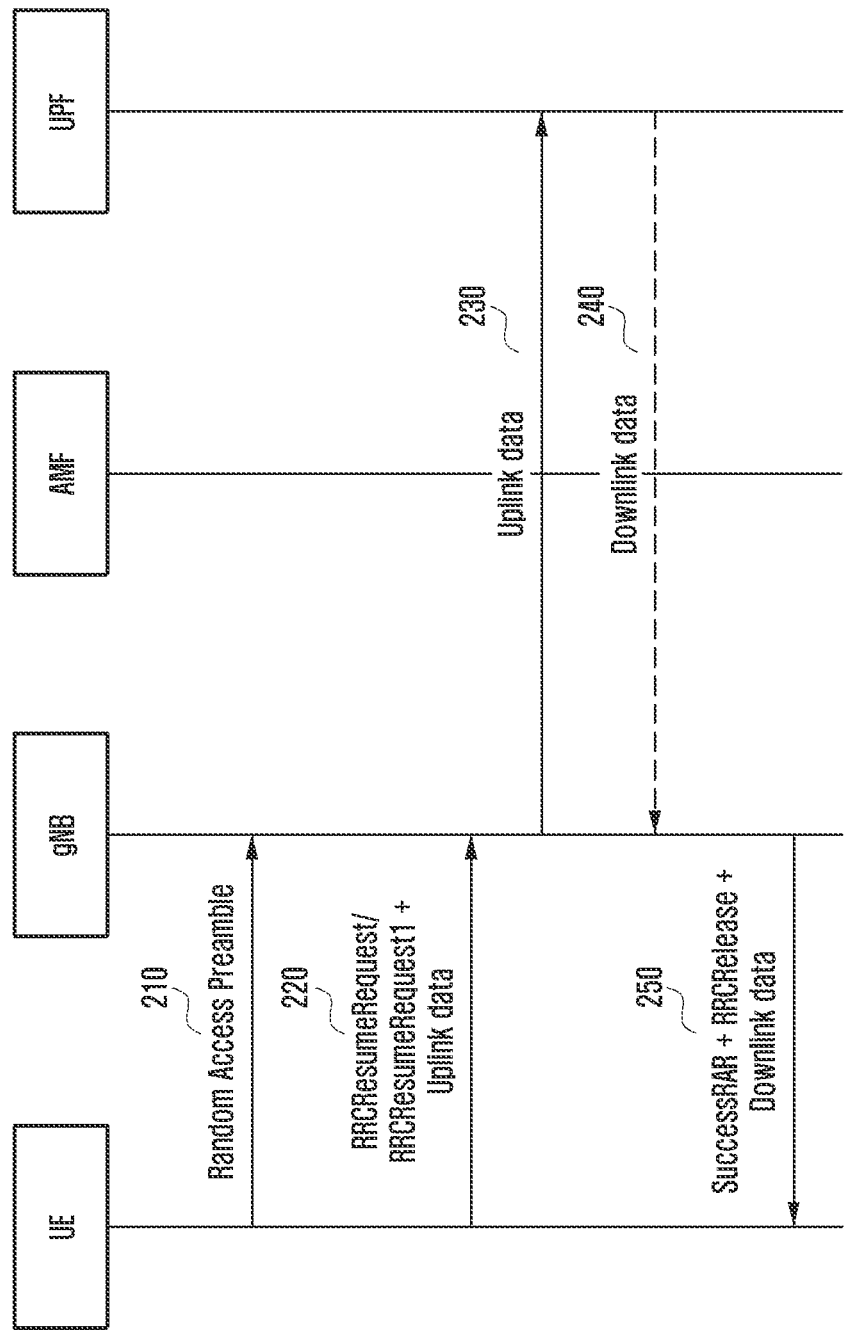
FIG. 2 shows the signaling flow for small data transmission using 2 step RA.

FIG. 2 shows the signaling flow for small data transmission using 2 step RA.

1. When criteria to initiate 2 step RA for SDT is met, UE selects preamble/RO/PO from preambles/ROs/POs for SDT. UE transmits a MsgA including a random access preamble at operation 210.

In the MsgA payload, the UE sends an RRCResumeRequest/RRCResumeRequest1 to the gNB (same as the last serving gNB) on SRB0. It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token. The UE shall calculate it using the integrity algorithm (NIA or EIA) in the stored AS security context, which was negotiated between the UE and the last serving gNB and the $K_{RRCint}$ from the stored AS security context with the following inputs:

KEY: it shall be set to current $K_{RRCint}$;
BEARER: all its bits shall be set to 1;
DIRECTION: its bit shall be set to 1;
COUNT: all its bits shall be set to 1; and
MESSAGE: it shall be set to VarResumeMAC-Input with following inputs:
source PCI (set to the physical cell identity of the PCell the UE was connected to prior to suspension of the RRC connection or the PCell from which UE has previously received RRCRelease with suspend configuration);
target Cell-ID (set to the cellIdentity of the first PLMN-Identity included in the PLMN-IdentityInfoList broadcasted in SIB1 of the target cell, i.e., the cell to which the UE is sending small data); and
source C-RNTI (set to C-RNTI that the UE had in the PCell it was connected to prior to suspension of the RRC connection or it was communicating to prior to reception of RRCRelease with suspend configuration).

The UE resumes SRB1. UE resumes SRB2 if SDT is allowed/configured for SRB2 and UE resumes DRB(s) for which SDT is allowed/configured, derives new security keys using the NextHopChainingCount provided in the RRCRelease message of the previous RRC connection and re-establishes the AS security. Note that SRB0 is not suspended, so it is not required to be resumed. The user data are ciphered and integrity protected (only for DRBs configured with UP integrity protection) and transmitted on DTCH multiplexed with the RRCResumeRequest/RRCResumeRequest1 message on CCCH.

2. The gNB validates the resumeMAC-I and delivers the uplink data to UPF at operation 220. Optionally, the gNB receives downlink data from UPF at operation 230.

3. The gNB sends the RRCRelease message to keep the UE in RRC_INACTIVE in MsgB along with successRAR at operation 240. PDCCH is addressed to C-RNTI. If downlink data is available, they are sent ciphered and integrity protected (only for DRBs configured with UP integrity protection) on DTCH multiplexed with the RRCRelease message on DCCH. gNB may decide not to send the RRCRelease message together with successRAR. In this case upon completion of random access, UE monitors PDCCH addressed to C-RNTI. UL/DL data can be exchanged between UE and gNB until RRCRelease message is received or SDT procedure is terminated.

Figure 3:
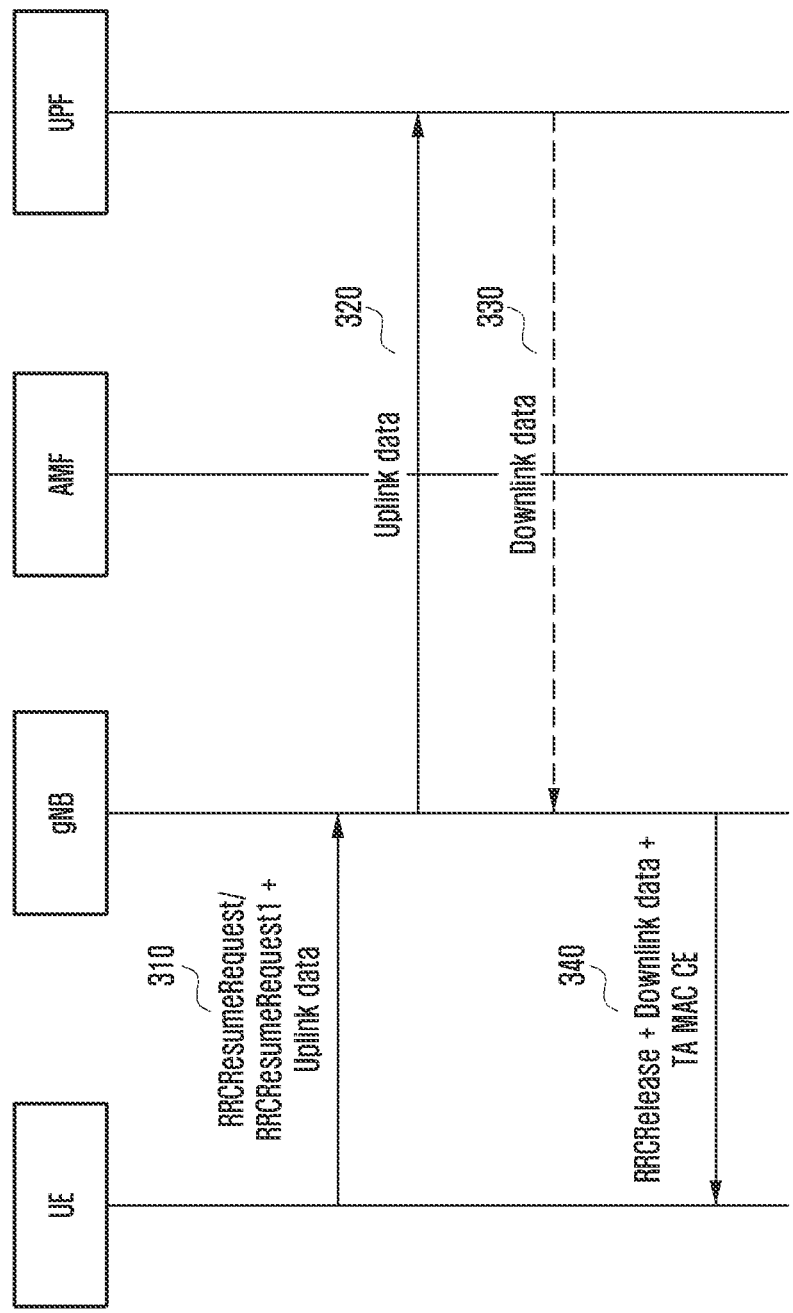
FIG. 3 shows the signaling flow for small data transmission using preconfigured physical uplink shared channel (PUSCH) resource.

FIG. 3 shows the signaling flow for small data transmission using preconfigured physical uplink shared channel (PUSCH) resource.

0. Criteria to initiate SDT using preconfigured PUSCH resources is met.

1. In the preconfigured PUSCH resource, the UE sends an RRCResumeRequest/RRCResumeRequest1 to the gNB (same as the last serving gNB) on SRB0 at operation 310. It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token. The UE shall calculate it using the integrity algorithm (NIA or EIA) in the stored AS security context, which was negotiated between the UE and the last serving gNB and the $K_{RRCint}$ from the stored AS security context with the following inputs:

KEY: it shall be set to current $K_{RRCint}$;
BEARER: all its bits shall be set to 1;
DIRECTION: its bit shall be set to 1;
COUNT: all its bits shall be set to 1; and
MESSAGE: it shall be set to VarResumeMAC-Input with following inputs:
source PCI (set to the physical cell identity of the PCell the UE was connected to prior to suspension of the RRC connection or the PCell from which UE has previously received RRCRelease with suspend configuration);
target Cell-ID (set to the cellIdentity of the first PLMN-Identity included in the PLMN-IdentityInfoList broadcasted in SIB1 of the target cell, i.e., the cell to which the UE is sending small data); and
source C-RNTI (set to C-RNTI that the UE had in the PCell it was connected to prior to suspension of the RRC connection or it was communicating to prior to reception of RRCRelease with suspend configuration).

The UE resumes SRB1. UE resumes SRB2 if SDT is allowed/configured/enabled for SRB2 and UE resumes and DRB(s) for which SDT is allowed/configured/enabled, Note that SRB0 is not suspended, so it is not required to be resumed. The UE derives new security keys using the NextHopChainingCount provided in the RRCRelease message of the previous RRC connection and re-establishes the AS security. The user data are ciphered and integrity protected (only for DRBs configured with UP integrity protection) and transmitted on DTCH multiplexed with the RRCResumeRequest/RRCResumeRequest1 message on CCCH.

The UE can alternately transmit its small data by using one of the following options:

RRCResumeRequest (or new RRC message). resumeIdentity, ResumeMAC-I, resumeCause, and non-access stratum (NAS) container may be included in RRCResumeRequest/RRCResumeRequest1. NAS container includes UL data.

new media access control (MAC) control element (CE) (resumeIdentity, ResumeMAC-I)+uplink data (on DTCH). resumeIdentity is provided for UE identification purpose. ResumeMAC-I is for security.

2. The gNB validates the resumeMAC-I and delivers the uplink data to UPF at operation 320. Optionally, the gNB receives downlink data from UPF at operation 330.

3. The gNB sends the RRCRelease message to keep the UE in RRC_INACTIVE along with timing advance (TA) MAC CE at operation 340. The PDCCH is addressed to C-RNTI. The C-RNTI is the one which the UE used in cell from which it received preconfigured PUSCH resources. Alternately, the C-RNTI can be assigned along with preconfigured PUSCH resources. If downlink data is available, they are sent ciphered and integrity protected (only for DRBs configured with UP integrity protection) on DTCH multiplexed with the RRCRelease message on DCCH.

(Alternate 1) An alternate signaling flow can be considered, wherein gNB can schedule UL grant (PDCCH addressed to C-RNTI) before RRCRelease. In the UL transmission, UE can indicate if it has more data to transmit. If UE has more data to transmit, gNB can schedule UL grant. Otherwise, RRCRelease. In the UL transmission, UE can also include synchronization signal and physical broadcast block (SSB) ID(s) of SSB above threshold if the SSB indicated by physical RA channel (PRACH) preamble is no longer suitable.

(Alternate 2) Alternatively, gNB can transmit PDCCH addressed to RNTI (i.e., RNTI is the one assigned by gNB along with preconfigured resource. It can be assigned to other UEs as well) and scheduled downlink (DL) transport block (TB) includes contention resolution identity (it is first X bits (e.g., 48 bits) of resume message) and C-RNTI. If it matches with UE's contention resolution identity, UE stops the monitoring timer and UE can consider small data transmission as successful.

In the response of the small data transmission, UE can receive a signal (RRC message or DL control information (DCI)) for the following purpose: releasing pre-configured PUSCH or switching to Resume procedure (i.e., RRC_CONNECTED).

RRC-less approach for RA channel (RACH) based small data transmission:

UL data is included in MsgA/Msg3.

Upon receiving MsgA/Msg3, gNB needs to identify the UE which has transmitted MsgA/Msg3. For UE identification, one of the following information is included in MsgA/Msg3.

Option 1: C-RNTI (C-RNTI used by UE during the last RRC connection);
Option 2: Full I-RNTI; or
Option 3: Short I-RNTI.

The UE ID to be used can be pre-defined; or network can indicate which one of the above IDs is included in MsgA/Msg3.

UE ID is included in MAC CE.

Upon receiving MsgA/Msg3, gNB should be able to authenticate the UE which has transmitted UL data in MsgA/Msg3. For authentication, one of the following is included:

Option 1: Generate MAC-I over UL data;
  MAC CE including UE ID+MAC service data unit(s) (SDU(s)) including integrity protected UL data is transmitted in MsgA/Msg3.
Option 2: Generate resumeMAC-I; or
  MAC CE including UE ID and resumeMAC-I+MAC SDU(s) including UL data is transmitted in MsgA/Msg3.
Option 3: Generate MAC-I over UL data if integrity protection is enabled for DRB whose UL data is included in MsgA/Msg3. Otherwise, generate resume-MAC-I.
  MAC CE will include UE ID or UE ID+resumeMAC-I.
Option 4: Authentication only if integrity protection for DRBs is enabled.
  MAC CE including UE ID+MAC SDU(s) including UL data is transmitted in MsgA/Msg3. UL data may or may not be integrity protected depending on whether integrity protection (IP) is enabled or not for the corresponding DRB.

Contention Resolution

Contention resolution identity needs to be modified (currently it is 48 bits of CCCH/CCCH1 SDU). In the absence of RRC message, Contention resolution identity needs to be set to UE ID transmitted by UE in MsgA/Msg3.

Alternately, if C-RNTI is included in MsgA/Msg3, PDCCH addressed to C-RNTI can be used for contention resolution.

Security key (this is applicable to both RRC-less or RRC based SDT; Scenario is that UE is performing SDT in same serving cell as the serving cell in which UE entered inactive)

UE should not use security key in stored AS context for data protection and UE should generate new key using next hop chaining counter (NCC).

If security key in stored AS context is used, security parameters (BEARER, DIRECTION, COUNT) will be same for packet transmitted when RRC connected and packet transmitted for SDT. Security principle is to not repeat the same set of parameters for more than one packet. So security key should be generated using NCC. To avoid security issue, UE re-initializes the packet data convergence protocol (PDCP) state variable TX_NEXT to the value at the time of entering inactive; RX_NEXT and RX_DELIV can be set according to first received packet during SDT.

RRC-less approach for configured grant (CG) based small data transmission:

UL data is included in CG.

GNB can identify UE based on CG in which UL data is received. CG is UE specific. So there is no need to include UE ID along with UL data.

Upon receiving UL data in CG, gNB should be able to authenticate the UE which has transmitted UL data. For authentication, one of the following can be considered:

Option 1: Generate MAC-I over UL data;
  MAC SDU(s) including integrity protected UL data is transmitted in CG. No MAC CE.
Option 2: Generate resumeMAC-I; or
  MAC CE including resumeMAC-I+MAC SDU(s) including UL data is transmitted in CG.
Option 3: Generate MAC-I over UL data if integrity protection is enabled for DRB whose UL data is included in CG. Otherwise, generate resumeMAC-I.
Option 4: Authentication only if integrity protection for DRBs is enabled.
  MAC SDU(s) including UL data is transmitted in CG. UL data may or may not be integrity protected depending on whether IP is enabled or not for the corresponding DRB.

Trigger Condition for Selecting Between RRC Based and RRC Less Approach for Small Data Transmission Option 1: UE uses RRC-less if UE's current serving cell is same as the primary cell (PCell) where UE was connected to prior to suspension of the RRC connection.

Option 2: UE uses RRC-less if UE's current serving cell belongs to the same gNB as the gNB of the PCell where UE was connected to prior to suspension of the RRC connection.

Option 3: UE uses RRC-less if UE's current serving cell is same as the PCell where UE was connected to prior to suspension of the RRC connection and integrity protection is enabled for the DRB which triggered small data transmission.

Option 4: UE uses RRC-less if UE's current serving cell belongs to the same gNB as the gNB of the PCell where UE was connected to prior to suspension of the RRC connection and integrity protection is enabled for the DRB which triggered small data transmission.

Option 5: If CG is used for small data transmission, use RRC less; otherwise RRC based.

In each of option 1 to option 5, addition condition, i.e., if network supports RRC-less can be included. Whether network supports can be signaled in system information.

Small data transmission is configured by the network (i.e., gNB) on a per DRB (or radio bearer (RB)) basis. The SDT procedure is initiated by UE in RRC_INACTIVE when data arrives only for DRB(s) (or RB(s)) for which SDT is configured. It is possible that data for non SDT DRB (or RB) is not available at the time of initiation of SDT procedure. However, data for non SDT DRB (or RB) may become available while the SDT procedure is ongoing. Method is needed to handle arrival of non SDT DRB (or RB) data while SDT procedure is ongoing.

Figure 4:
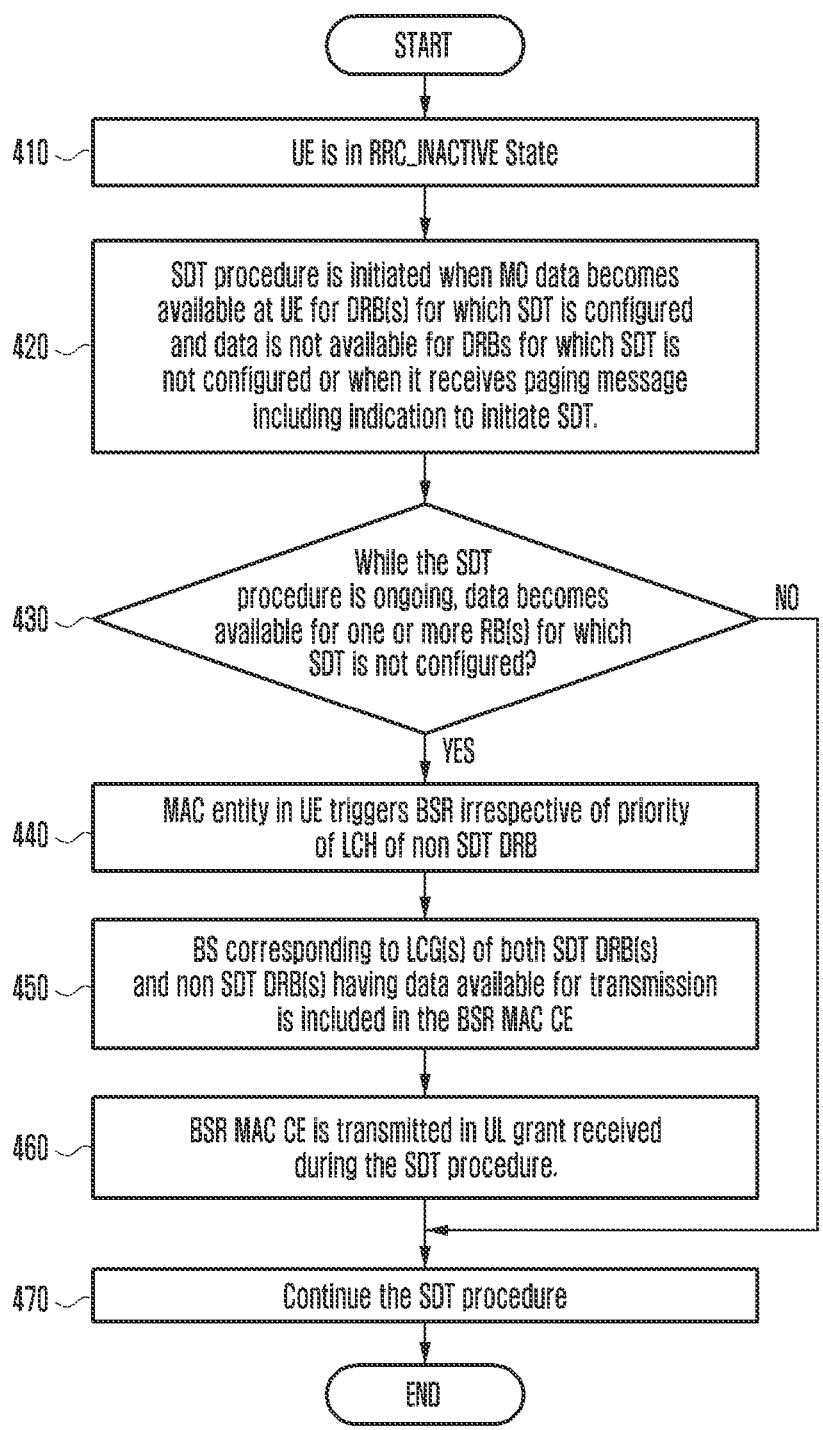
FIGS. 4 to 8 illustrate the operations of UE in embodiments of this disclosure for handling non SDT data radio bearer (DRB) during the SDT procedure.

Embodiment 1: FIG. 4 illustrates the operation of UE in an embodiment of this disclosure for handling non SDT DRB during the SDT procedure.

UE is in RRC_INACTIVE state at operation 410. Network (i.e., gNB) has signaled to UE the DRB(s) for which SDT is enabled/allowed. In an alternate embodiment, gNB has signaled to UE the RB(s) (i.e., DRB(s) and/or SRBs) for which SDT is enabled/allowed. The signaling can be RRCReconfiguration message or RRC release message or any other signaling message.

SDT procedure is initiated by UE when mobile originated (MO) data becomes available at UE for DRB(s) for which SDT is configured/enabled/allowed and data is not available for DRBs for which SDT is not configured and other criteria (e.g., sum of data volume in all RB(s) for which SDT is configured/enabled/allowed is less than (or less than equal to) the SDT data threshold, DL RSRP is greater than (or greater than equal to) reference signal received power (RSRP) threshold) to initiate SDT is met at operation 420 or SDT procedure is initiated by UE when it receives paging message including indication to initiate SDT. In an alternate embodiment, SDT procedure is initiated by UE when MO data (can be user data or signaling data) becomes available at UE for RB(s) (i.e., DRB(s) and/or SRBs) for which SDT is configured and data is not available for RBs for which SDT is not configured and other criteria (e.g., SDT data threshold, RSRP threshold, SDT resource validity, etc.) to initiate SDT is met.

Upon initiation of SDT procedure, UE starts a timer for SDT. This timer can also be referred as SDT failure detection timer. Note that timer for SDT is different from the timer T319 which UE starts when it initiates RRC connection resume procedure. The value of timer for SDT is configured/signaled by gNB in system information of camped cell or in RRCRelease message or in RRCReconfiguration message. If not signaled, UE can use default value of timer for SDT. The default value of timer for SDT can be pre-defined. Note that upon initiation of SDT, UE resumes SRB1, UE resumes SRB 2 if SDT is allowed/enabled/configured for SRB2 and/or UE resumes DRB(s) for which SDT is allowed/enabled/configured, UE derive security keys and transmit RRCResumeRequest/RRCResumeRequest as explained earlier. Note that SRB0 is not suspended, so it is not required to be resumed. SDT procedure is completed/terminated if this timer is expired or UE receives RRCRelease message from gNB or UE receives RRCResume message from gNB or UE receives RRCSetup message from gNB or UE receives RRCReject message from gNB or UE receives indication/MAC CE from gNB to terminate SDT procedure. Note that timer is stopped when the SDT procedure is completed or terminated. If UE receives RRCRelease including suspend configuration, SDT procedure/session is considered completed; UE stops the SDT timer; UE stores the current (i.e. those derived when SDT procedure is initiated) KRRCint key and current KgNB key; UE deletes KRRCenc, KUPint, KUPenc keys; UE stores the C-RNTI and PCI/cell identity of the cell from which UE has received RRCRelease message and UE stores the NCC received in RRC Release message. If UE receives RRCRelease without suspend configuration or UE receives RRCReject, SDT procedure/session is considered completed; UE stops the SDT timer; UE enters RRC_IDLE; UE delete all the derived security keys and stored AS context.

While the SDT procedure is ongoing (in other words while the SDT timer is running), the UE identifies whether data becomes available for one or more RB(s) for which SDT is not configured/enabled/allowed at operation 430. While the SDT procedure is ongoing, if data becomes available for one or more DRBs for which SDT is not configured/enabled/allowed (or if data becomes available for one or more RBs for which SDT is not configured/allowed/enabled), UE may perform the following operation; or (Alternate) While the SDT procedure is ongoing (in other words while the SDT timer is running), if data becomes available for one or more RBs for which SDT is not configured/allowed/enabled and if cumulative volume of data for non SDT RBs (i.e. RBs for which SDT is not configured/allowed/enabled) is greater than threshold, where threshold is configured to UE by gNB in RRCRelease message or in RRCReconfiguration message or system information or another signaling message, UE may perform the following operation; or (Alternate) While the SDT procedure is ongoing (in other words while the SDT timer is running), if data becomes available for one or more RBs for which SDT is not configured and if logical channel (LCH) priority of non SDT RB for which data arrives is greater than highest LCH priority of all SDT RBs, UE may perform the following operation; or (Alternate) While the SDT procedure is ongoing, if data arrives for non SDT SRB or if cumulative volume of data for non SDT DRBs is greater than threshold, where threshold is configured to UE by gNB in RRCRelease message or in RRCReconfiguration message or system information or another signaling message, UE may perform the following operation:

MAC entity in the UE triggers buffer status report (BSR) at operation 440. In an embodiment, the BSR can be regular BSR.

In case of data arrival for SDT DRB (or RB) while SDT is ongoing or in case of data arrival for a DRB (or RB) while SDT is not ongoing (e.g. in RRC connected state), if data become available for LCH of a DRB (or RB) and if the priority of LCH of DRB (or RB) for which UL data becomes available is higher than the highest priority LCH of DRB(s) (or RB(s)) having UL data available, then regular BSR is triggered. However, while the SDT procedure is ongoing and if data becomes available for one or more DRBs (or RB(s)) for which SDT is not configured, then irrespective of LCH priority of non SDT DRB (or RB), BSR is triggered.

Buffer size (BS) corresponding to logical channel group(s) (LCG(s)) of DRB(s) (or RB(s)) having data available for transmission is included in the BSR MAC CE at operation 450. In an embodiment, the DRBs (or RB(s)) are non SDT DRB(s) (or RB(s)). In another embodiment, the DRBs (or RB(s)) can be both SDT DRB(s) (or RB(s)) and non SDT DRBs (or RB(s)). In an embodiment, if enough size is not available to indicate BS of LCG(s) of both SDT and non SDT DRBs (or RB(s)), UE may prioritize indicating BS of LCG(s) of non SDT DRBs (or RB(s)). In another embodiment, if enough size is not available to indicate BS of LCG(s) of both SDT and non SDT DRBs (or RB(s)), UE may prioritize indicating BS of LCG(s) of SDT DRBs (or RB(s)). In another embodiment, if enough size is not available to indicate BS of LCG(s) of both SDT and non SDT DRBs (or RB(s)), UE may prioritize indicating BS of LCG(s) according to decreasing order of the highest priority logical channel LCH priority in each of these LCG(s), and in case of equal priority, in increasing order of LCGID. Note that one LCG can be mapped to one or more LCHs. So selection of LCG is based on LCH priority of highest priority logical channel mapped to LCG. For example, LCG 1 is mapped to LCH 1 and LCH2, LCG 2 is mapped to LCH 3 and LCH 4. LCH1 has higher priority than LCH2. LCH3 has higher priority than LCH4. So UE select between LCG1 and LCG2 based on LCH priority of LCH1 and LCH 3. If LCH1 has higher priority than LCH 3, UE selects LCG1 first and then LCG2. If LCH3 has higher priority than LCH 1, UE selects LCG2 first and then LCG1. If LCH3 has same priority has LCH 1, UE select LCG 1 first and then LCG2.

In an embodiment, for BSR triggered due to arrival of data of non SDT DRB (or RB), scheduling request (SR) is not triggered, and RA is not triggered. BSR MAC CE is transmitted in UL grant received during the SDT procedure at operation 460.

Normally upon triggering of regular BSR (e.g., in case of data arrival for SDT DRB (or RB) while SDT is ongoing or in case of data arrival for a DRB (or RB) while SDT is not ongoing), SR is triggered, and triggered SR triggers RA if physical UL control channel (PUCCH) resources are not available for SR. However, for BSR triggered due to arrival of data of non SDT DRB (or RB) during the SDT procedure, SR is not triggered, and RA is not triggered.

In an alternate embodiment, UE may trigger RA to request UL grant for BSR MAC CE (e.g. if PUCCH resources are not available for SR).

Upon receiving the BSR with BS of non SDT DRBs (or RB(s)), gNB comes to know about the availability of data of non SDT DRB (or RB) at UE and may resume the RRC connection by sending RRCResume to UE. In an alternate embodiment, gNB may send RRCRelease to terminate the SDT procedure and UE then initiate RRC connection resume procedure (connection resume procedure details as explained earlier) after termination of SDT procedure. In an alternate embodiment, upon receiving the BSR with BS of non SDT DRBs (or RB(s)) or upon receiving indication about the data arrival in non SDT RB(s), gNB comes to know about the data of non SDT DRB (or RB) and may resume the RRC connection by sending RRCResume to UE or indicate (indication can be sent in signaling message or MAC CE or DCI) UE to consider non SDT RB(s) as SDT RB(s). UE resumes these RB(s) (re-establish PDCP entities and RLC entities of these RB(s)) and transmits data from these RBs during the ongoing SDT procedure at operation 470.

In the UL grant received during the SDT procedure, UE may multiplex data from both SDT and non SDT LCHs. If data is available for both SDT and non SDT LCH, UE may first prioritize SDT LCH(s) wherein data is included from SDT LCHs according to logical channel prioritization (LCP) procedure. If resources remain after including data from SDT LCH, UE may include data from non SDT LCHs. In an embodiment, in the UL grant received during the SDT procedure, UE may multiplex data from both SDT and non SDT LCHs, if indicated by network. Otherwise not. Whether to multiplex non SDT LCHs in the UL grant during the SDT procedure or not, can be indicated by gNB in RRCReconfiguration message or RRCRelease message or in system information or in another signaling message (e.g., DCI, MAC CE, etc.).

(Alternate) In the UL grant received during the SDT procedure, UE may multiplex data from both SDT and non SDT LCHs according to LCP procedure. In an embodiment, in the UL grant received during the SDT procedure, UE may multiplex data from both SDT and non SDT LCHs, if indicated by network. Otherwise not. Whether to multiplex non SDT LCHs in the UL grant during the SDT procedure or not, can be indicated by gNB in RRCReconfiguration message or RRCRelease message or in system information or in another signaling message (e.g., DCI, MAC CE, etc.).

(Alternate) In the UL grant received during the SDT procedure, UE multiplexes data from SDT LCHs according to LCP procedure. Data from non SDT LCHs are not included in the UL grant.

UE continue SDT procedure at operation 470 until the SDT procedure is terminated/completed. SDT procedure is completed/terminated if SDT timer is expired or UE receives RRCRelease message from gNB or UE receives RRCResume message from gNB or UE receives RRCSetup message from gNB or UE receives RRCReject message from gNB or UE receives indication/MAC CE from gNB to terminate SDT procedure.

Figure 5:
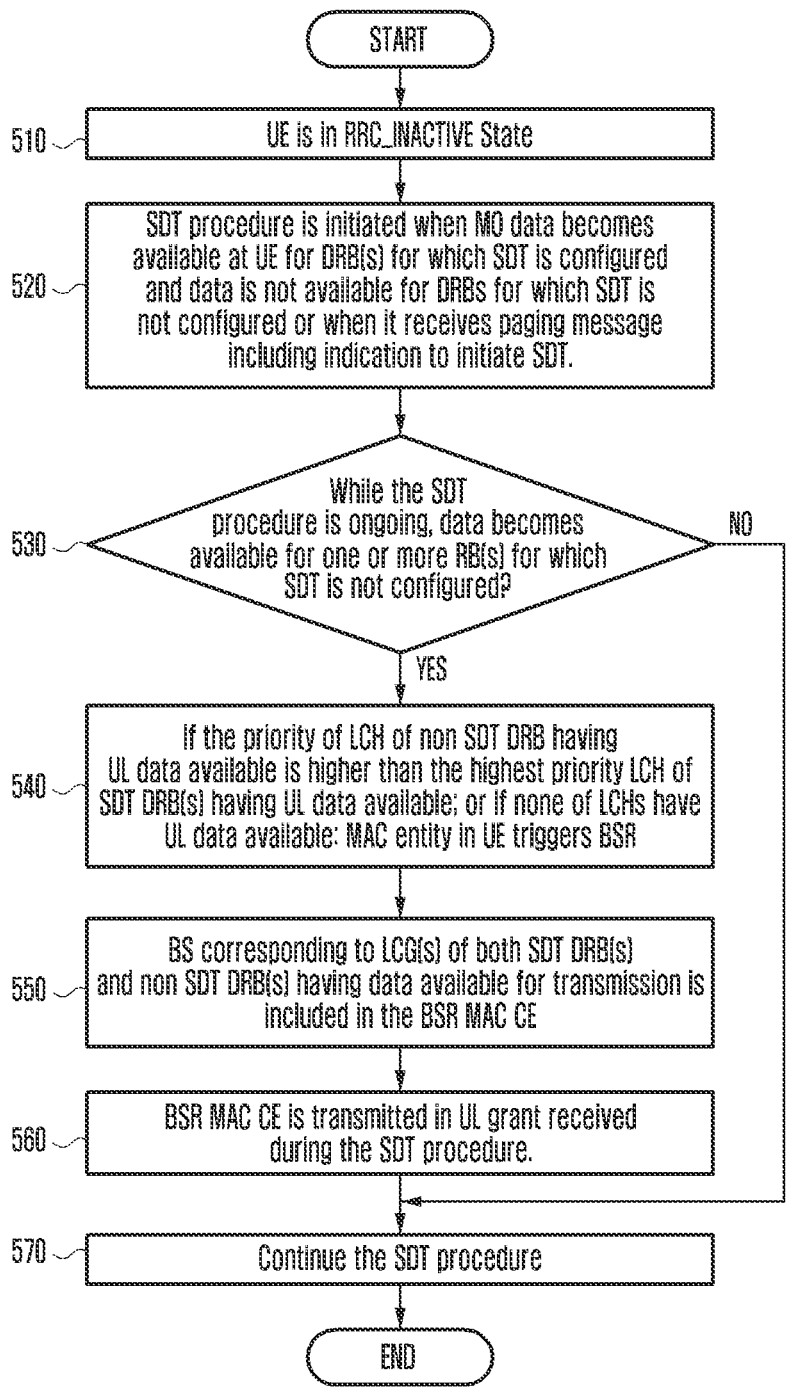

Embodiment 2: FIG. 5 illustrates the operation of UE in an embodiment of this disclosure for handling non SDT DRB during the SDT procedure.

UE is in RRC_INACTIVE state at operation 510. Network (i.e., gNB) has signaled to UE the DRB(s) for which SDT is enabled/allowed. The signaling can be RRCReconfiguration message or RRC release message. In an alternate embodiment, gNB has signaled to UE the RB(s) (i.e., DRB(s) and/or SRBs) for which SDT is enabled/allowed.

SDT procedure is initiated by UE when MO data becomes available at UE for DRB(s) for which SDT is configured and data is not available for DRBs for which SDT is not configured and other criteria (e.g., sum of data volume in all RB(s) for which SDT is configured/enabled/allowed is less than (or less than equal to) the SDT data threshold, DL RSRP is greater than (or greater than equal to) RSRP threshold) to initiate SDT is met at operation 520 or SDT procedure is initiated by UE when it receives paging message including indication to initiate SDT. In an alternate embodiment, SDT procedure is initiated by UE when MO data (can be user data or signaling data) becomes available at UE for RB(s) (i.e., DRB(s) and/or SRBs) for which SDT is configured and data is not available for RBs for which SDT is not configured and other criteria (e.g., SDT data threshold, RSRP threshold, SDT resource validity, etc.) to initiate SDT is met.

Upon initiation of SDT procedure, UE starts a timer for SDT. This timer can also be referred as SDT failure detection timer. Note that timer for SDT is different from the timer T319 which UE starts when it initiates RRC connection resume procedure. The value of timer is configured/signaled by gNB in system information of camped cell or in RRCRelease message or in RRCReconfiguration message. If not signaled, UE can use default value of timer for SDT. The default value of timer for SDT can be pre-defined. Note that upon initiation of SDT, UE resumes SRB1, UE resumes SRB 2 if SDT is allowed/enabled/configured for SRB2 and/or UE resumes DRB(s) for which SDT is allowed/enabled/configured, UE derive security keys and transmit RRCResumeRequest/RRCResumeRequest as explained earlier. Note that SRB 0 is not suspended, so it is not required to be resumed. SDT procedure is completed/terminated if this timer is expired or UE receives RRCRelease message from gNB or UE receives RRCResume message from gNB or UE receives RRCSetup message from gNB or UE receives RRCReject message from gNB or UE receives indication/MAC CE from gNB to terminate SDT procedure. Note that timer is stopped when the SDT procedure is completed or terminated. If UE receives RRCRelease including suspend configuration, SDT procedure/session is considered completed; UE stops the SDT timer; UE stores the current (i.e. those derived when SDT procedure was initiated) KRRCint key and current KgNB key; UE deletes KRRCenc, KUPint, KUPenc keys; UE stores the C-RNTI and PCI/cell identity of the cell from which UE has received RRCRelease message and UE stores the NCC received in RRC Release message. If UE receives RRCRelease without suspend configuration or UE receives RRCReject, SDT procedure/session is considered completed; UE stops the SDT timer; UE enters RRC_IDLE; UE delete all the derived security keys and stored AS context.

While the SDT procedure is ongoing (in other words while the SDT timer is running), the UE identifies whether data becomes available for one or more RB(s) for which SDT is not configured/enabled/allowed at operation 530. While the SDT procedure is ongoing (in other words while the SDT timer is running), if data becomes available for one or more DRBs for which SDT is not configured (or if data becomes available for one or more RBs for which SDT is not configured), UE may perform the following operation; or (Alternate) While the SDT procedure is ongoing (in other words while the SDT timer is running), if data becomes available for one or more RBs for which SDT is not configured and if cumulative volume of data for non SDT RBs is greater than threshold, where threshold is configured to UE by gNB in RRCRelease message or in RRCReconfiguration message or system information or another signaling message, UE may perform the following operation; or (Alternate) While the SDT procedure is ongoing (in other words while the SDT timer is running), if data becomes available for one or more RBs for which SDT is not configured and if LCH priority of non SDT RB for which data arrives is greater than highest LCH priority of all SDT RBs, UE may perform the following operation; or (Alternate) While the SDT procedure is ongoing (in other words while the SDT timer is running), if data arrives for non SDT SRB or if cumulative volume of data for non SDT DRBs is greater than threshold, where threshold is configured to UE by gNB in RRCRelease message or in RRCReconfiguration message or system information or another signaling message, UE may perform the following operation:

If the priority of LCH of non SDT DRB (or RB) having UL data available is higher than the highest priority LCH of SDT DRB(s) (or RB(s)) having UL data available; or if none of LCHs have UL data available: MAC entity in the UE triggers BSR at operation 540. In an embodiment, the BSR can be regular BSR.

BS corresponding to LCG(s) of DRB(s) (or RB(s)) having data available for transmission is included in the BSR MAC CE at operation 550. In an embodiment, the DRBs (or RB(s)) are non SDT DRB(s) (or RB(s)). In another embodiment, the DRBs (or RB(s)) can be both SDT DRB(s) (or RB(s)) and non SDT DRBs (or RB(s)). In an embodiment, if enough size is not available to indicate BS of LCG(s) of both SDT and non SDT DRBs (or RB(s)), UE may prioritize indicating BS of LCG(s) of non SDT DRBs (or RB(s)). In another embodiment, if enough size is not available to indicate BS of LCG(s) of both SDT and non SDT DRBs (or RB(s)), UE may prioritize indicating BS of LCG(s) of SDT DRBs (or RB(s)). In another embodiment, if enough size is not available to indicate BS of LCG(s) of both SDT and non SDT DRBs (or RB(s)), UE may prioritize indicating BS of LCG(s) according to decreasing order of the LCH priority in each of these LCG(s), and in case of equal priority, in increasing order of LCGID. Note that one LCG can be mapped to one or more LCHs. So selection of LCG is based on LCH priority of highest priority logical channel mapped to LCG. For example, LCG 1 is mapped to LCH 1 and LCH2, LCG 2 is mapped to LCH 3 and LCH 4. LCH1 has higher priority than LCH2. LCH3 has higher priority than LCH4. So UE select between LCG1 and LCG2 based on LCH priority of LCH1 and LCH 3. If LCH1 has higher priority than LCH 3, UE selects LCG1 first and then LCG2. If LCH3 has higher priority than LCH 1, UE selects LCG2 first and then LCG1. If LCH3 has same priority has LCH 1, UE select LCG 1 first and then LCG2.

In an embodiment, for BSR triggered due to arrival of data of non SDT DRB (or RB), SR is not triggered, and RA is not triggered. BSR MAC CE is transmitted in UL grant received during the SDT procedure at operation 560.

Normally upon triggering of regular BSR (e.g., in case of data arrival for SDT DRB (or RB) while SDT is ongoing or in case of data arrival for a DRB (or RB) while SDT is not ongoing), SR is triggered, and triggered SR triggers RA if PUCCH resources are not available for SR. However, for BSR triggered due to arrival of data of non SDT DRB (or RB) during the SDT procedure, SR is not triggered, and RA is not triggered.

In an alternate embodiment, UE may trigger RA to request UL grant for BSR MAC CE (e.g. if PUCCH resources are not available for SR).

Upon receiving the BSR with BS of non SDT DRBs (or RB(s)), gNB knows about the data of non SDT DRB (or RB) and may resume the RRC connection by sending RRCResume to UE. In an alternate embodiment, gNB may send RRCRelease to terminate the SDT procedure and UE then initiate RRC connection resume procedure (connection resume procedure details as explained earlier) after termination of SDT procedure. In an alternate embodiment, upon receiving the BSR with BS of non SDT DRBs (or RB(s)) or upon receiving indication about the data arrival in non SDT RB(s), gNB knows about the data of non SDT DRB (or RB) and may resume the RRC connection by sending RRCResume to UE or indicate (indication can be sent in signaling message or MAC CE or DCI) UE to consider non SDT RB(s) as SDT RB(s). UE resumes these RBs and transmits data from these RBs during the ongoing SDT procedure at operation 570.

In the UL grant received during the SDT procedure, UE may multiplex data from both SDT and non SDT LCHs. If data is available for both SDT and non SDT LCH, UE may first prioritize SDT LCH(s) wherein data is included from SDT LCHs according to LCP procedure. If resources remain after including data from SDT LCH, UE may include data from non SDT LCHs. In an embodiment, in the UL grant received during the SDT procedure, UE may multiplex data from both SDT and non SDT LCHs, if indicated by network. Otherwise not. Whether to multiplex non SDT LCHs in the UL grant during the SDT procedure or not, can be indicated by gNB in RRCReconfiguration message or RRCRelease message or in system information or in another signaling message (e.g., DCI, MAC CE, etc.).

(Alternate) In the UL grant received during the SDT procedure, UE may multiplex data from both SDT and non SDT LCHs according to LCP procedure. In an embodiment, in the UL grant received during the SDT procedure, UE may multiplex data from both SDT and non SDT LCHs, if indicated by network. Otherwise not. Whether to multiplex non SDT LCHs in the UL grant during the SDT procedure or not, can be indicated by gNB in RRCReconfiguration message or RRCRelease message or in system information or in another signaling message (e.g., DCI, MAC CE, etc.).

(Alternate) In the UL grant received during the SDT procedure, UE multiplexes data from SDT LCHs according to LCP procedure. Data from non SDT LCHs are not included in the UL grant.

UE continue SDT procedure at operation 570 until the SDT procedure is terminated/completed. SDT procedure is completed/terminated if SDT timer is expired or UE receives RRCRelease message from gNB or UE receives RRCResume message from gNB or UE receives RRCSetup message from gNB or UE receives RRCReject message from gNB or UE receives indication/MAC CE from gNB to terminate SDT procedure.

Figure 6:
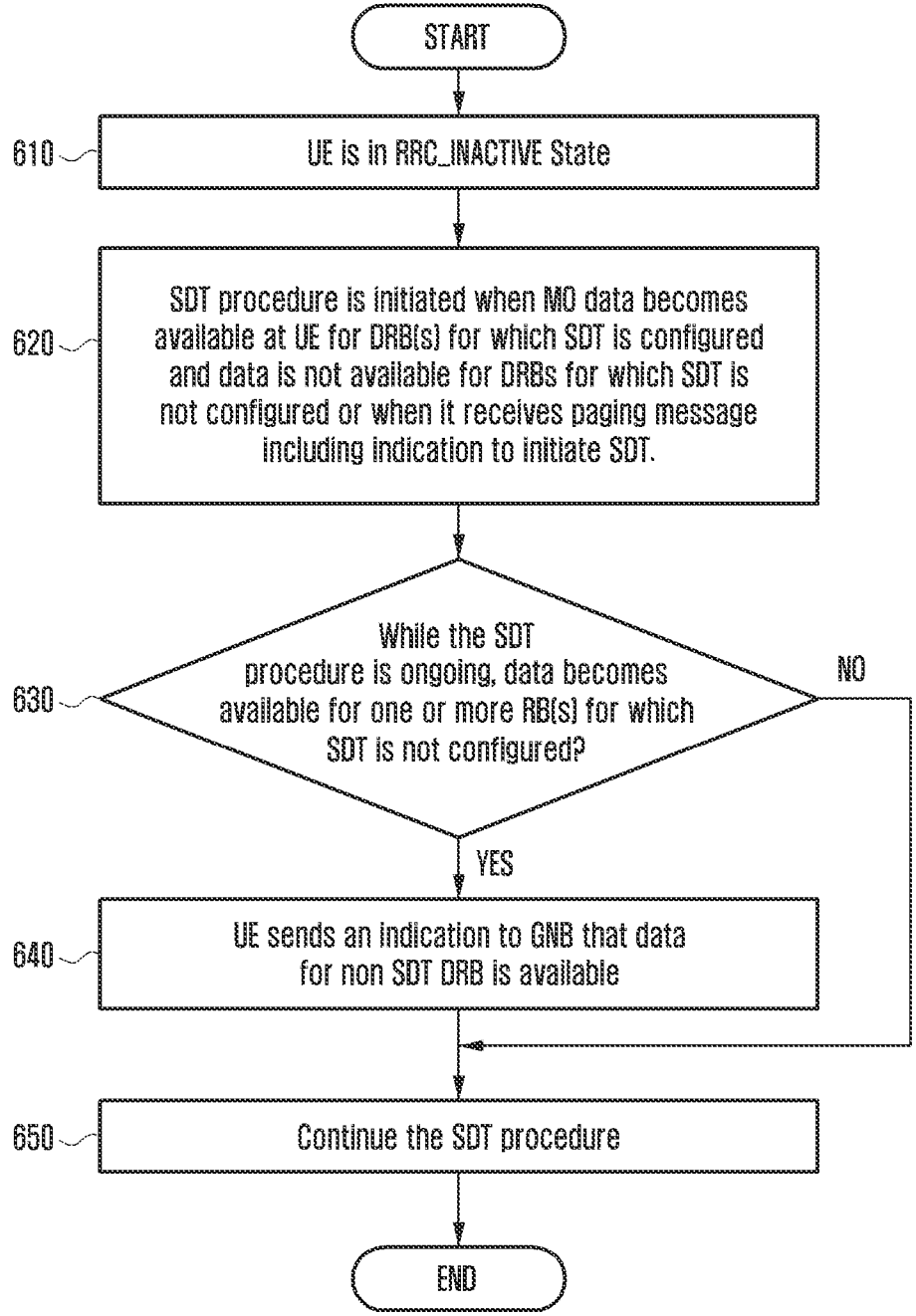

Embodiment 3: FIG. 6 illustrates the operation of UE in an embodiment of this disclosure for handling non SDT DRB during the SDT procedure.

UE is in RRC_INACTIVE state at operation 910. Network (i.e., gNB) has signaled to UE the DRB(s) for which SDT is enabled/allowed. The signaling can be RRCReconfiguration message or RRC release message. In an alternate embodiment, gNB has signaled to UE the RB(s) (i.e., DRB(s) and/or SRBs) for which SDT is enabled/allowed.

SDT procedure is initiated by UE when MO data becomes available at UE for DRB(s) for which SDT is configured and data is not available for DRBs for which SDT is not configured and other criteria (e.g., sum of data volume in all RB(s) for which SDT is configured/enabled/allowed is less than (or less than equal to) SDT data threshold, DL RSRP is greater than (or greater than equal to) RSRP threshold) to initiate SDT is met at operation 920 or SDT procedure is initiated by UE when it receives paging message including indication to initiate SDT. In an alternate embodiment, SDT procedure is initiated by UE when MO data (can be user data or signaling data) becomes available at UE for RB(s) (i.e., DRB(s) and/or SRBs) for which SDT is configured and data is not available for RBs for which SDT is not configured and other criteria (e.g., SDT data threshold, RSRP threshold, SDT resource validity, etc.) to initiate SDT is met. Upon initiation of SDT procedure, UE sends an RRCResumeRequest/RRCResumeRequest1 to the gNB on SRB 0. It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token. The UE shall calculate it using the integrity algorithm (NIA or EIA) in the stored AS security context, which was negotiated between the UE and the last serving gNB and the $K_{RRCint}$ from the stored AS security context.

Upon initiation of SDT procedure, UE starts a timer for SDT. This timer can also be referred as SDT failure detection timer. Note that timer for SDT is different from the timer T319 which UE starts when it initiates RRC connection resume procedure. The value of timer is configured/signaled by gNB in system information of camped cell or in RRCRelease message or in RRCReconfiguration message. If not signaled, UE can use default value of timer for SDT. The default value of timer for SDT can be pre-defined. Note that upon initiation of SDT, UE resumes SRB1, UE resumes SRB 2 if SDT is allowed/enabled/configured for SRB2 and/or UE resumes DRB(s) for which SDT is allowed/enabled/configured, UE derive security keys and transmit RRCResumeRequest/RRCResumeRequest as explained earlier. Note that SRB 0 is not suspended, so it is not required to be resumed. SDT procedure is completed/terminated if this timer is expired or UE receives RRCRelease message from gNB or UE receives RRCResume message from gNB or UE receives RRCSetup message from gNB or UE receives RRCReject message from gNB or UE receives indication/MAC CE from gNB to terminate SDT procedure. Note that timer is stopped when the SDT procedure is completed or terminated. If UE receives RRCRelease including suspend configuration, SDT procedure/session is considered completed; UE stops the SDT timer; UE stores the current (i.e. those derived when SDT procedure was initiated) KRRCint key and current KgNB key; UE deletes KRRCenc, KUPint, KUPenc keys; UE stores the C-RNTI and PCI/cell identity of the cell from which UE has received RRCRelease message and UE stores the NCC received in RRC Release message. If UE receives RRCRelease without suspend configuration or UE receives RRCReject, SDT procedure/session is considered completed; UE stops the SDT timer; UE enters RRC_IDLE; UE delete all the derived security keys and stored AS context.

While the SDT procedure is ongoing (in other words while the SDT timer is running), the UE identifies whether data becomes available for one or more RB(s) for which SDT is not configured at operation 930. While the SDT procedure is ongoing, if data becomes available for one or more DRBs for which SDT is not configured/allowed/enabled (or if data becomes available for one or more RBs for which SDT is not configured/enabled/allowed), UE may perform the following operation; or (Alternate) While the SDT procedure is ongoing (in other words while the SDT timer is running), if data becomes available for one or more RBs for which SDT is not configured/allowed/enabled and if cumulative volume of data for non SDT RBs is greater than threshold, where threshold is configured to UE by gNB in RRCRelease message or in RRCReconfiguration message or system information or another signaling message, UE may perform the following operation; or (Alternate) While the SDT procedure is ongoing (in other words while the SDT timer is running), if data becomes available for one or more RBs for which SDT is not configured/allowed/enabled and if LCH priority of non SDT RB for which data arrives is greater than highest LCH priority of all SDT RBs, UE may perform the following operation; or (Alternate) While the SDT procedure is ongoing (in other words while the SDT timer is running), if data arrives for non SDT SRB or if cumulative volume of data for non SDT DRBs is greater than threshold, where threshold is configured to UE by gNB in RRCRelease message or in RRCReconfiguration message or system information or another signaling message, UE may perform the following operation:

UE sends an indication to gNB (in other words inform the gNB) that data for non SDT DRB(s) (or non SDT RB(s)) is available at operation 640. In an embodiment UE can send an indication to gNB (in other words inform the gNB) that data for non SDT DRB(s) (or non SDT RB(s)) is available at operation 640 if GNB configures (in RRCRelease or RRCReconfiguration or System information) that UE can send the RRC message if data for non SDT RBs becomes available during the SDT session (i.e. while SDT timer is running).

Option 1: RRC message can include this indication (i.e. RRC message can inform the gNB that data for non SDT DRB(s) (or non SDT RB(s)) is available).

The RRC message is sent by UE using DCCH logical channel and signaling radio bearer SRB1. LCID corresponding to DCCH is added in MAC subheader of MAC SDU carrying this RRC message. RLC acknowledgement mode (i.e. RLC header is added to RRC message) is used for transmitting this RRC message and RLC acknowledgement is sent by GNB on receiving RLC PDU carrying this RRC message. This RRC message may include one or more of the following information:

List of DRB IDs for which data is arrived; Indication of data arrival for SRB2;

List of one or more RB IDs for which data is arrived (includes SRB/DRB); or

Data volume per RB or cumulative can also be indicated.

Indication of reason (normal or emergency) of data arrival
Indication of reason (emergency, highPriorityAccess, mo-Signalling, mo-Data, mo-VoiceCall, mo-VideoCall, mo-SMS, mps-PriorityAccess, mcs-PriorityAccess, etc.) of data arrival.

This RRC message can be a UE assistance information message or nonSDTDataIndication message.

This RRC message is encrypted and integrity protected using security keys generated upon SDT initiation (new security keys using the NextHopChainingCount provided in the RRCRelease message of the previous RRC connection are derived upon SDT initiation or in the RRCRelease message last received before the initiation of SDT procedure).

In an embodiment, the format of RRC message can be as follows:
NonSdtDataIndication The NonSdtDataIndication message is used to inform the network about the arrival of non-SDT data during SDT. When data mapped to non-SDT radio bearers becomes available during SDT (i.e. when SDT timer is running, UE initiates transmission of this message.

UEAssistanceInformation-v17-IEs is added in UEAssistanceInformation which includes nonSDT-Data-Indication.

In an embodiment, if configured to provide its preference to switch to RRC_CONNECTED upon data mapped to non-SDT radio bearers is available and if the UE did not transmit a UEAssistanceInformation message with nonSDT-Data-Indication since the start of the current SDT session, UE initiate transmission of the UEAssistanceInformation message to provide its preference to switch to RRC_CONNECTED upon data mapped to non-SDT radio bearers is available.

In an embodiment, if data mapped to non-SDT radio bearers is available during SDT (i.e. While the SDT timer is running) and if the UE did not transmit a UEAssistanceInformation message with nonSDT-Data-Indication since the start of the current SDT session: initiate transmission of the UEAssistanceInformation message to indicate availability of non SDT data.

In an embodiment, if configured to indicate availability of non SDT data and if the UE did not transmit a UEAssis-

| NonSdtDataIndication message |
|---|
| -- ASN1START<br>-- TAG-NonSdtDataIndication-START<br>NonSdtDataIndication-r17 ::=    SEQUENCE {<br>   criticalExtensions    CHOICE {<br>      NonSdtDataIndication    NonSdtDataIndication-IEs,<br>      criticalExtensionsFuture    SEQUENCE { }<br>   }<br>}<br>NonSdtDataIndication-IEs ::=    SEQUENCE {<br>   Information such as reason/cause for data arrival, RB ID(s), Data volume etc can be added in this IE.<br>   lateNonCriticalExtension    OCTET STRING    OPTIONAL,<br>   nonCriticalExtension    SEQUENCE { }    OPTIONAL<br>}<br>-- TAG- NonSdtDataArrivalIndication -STOP<br>-- ASN1STOP |

In an embodiment, the format of RRC message can be as follows:
UEAssistanceInformation The UEAssistanceInformation message is used for the indication of UE assistance information to the network.

tanceInformation message with nonSDT-Data-Indication since the start of the current SDT session: initiate transmission of the UEAssistanceInformation message to indicate availability of non SDT data upon data mapped to non-SDT radio bearers is available.

| UEAssistanceInformation message |
|---|
| -- ASN1START<br>-- TAG-UEASSISTANCEINFORMATION-START<br>UEAssistanceInformation ::=    SEQUENCE {<br>   criticalExtensions    CHOICE {<br>      ueAssistanceInformation    UEAssistanceInformation-IEs,<br>      criticalExtensionsFuture    SEQUENCE { }<br>   }<br>}<br>UEAssistanceInformation-IEs ::=    SEQUENCE {<br>   :<br>   lateNonCriticalExtension    OCTET STRING    OPTIONAL,<br>   nonCriticalExtension    UEAssistanceInformation-v1540-IEs    OPTIONAL<br>}<br>UEAssistanceInformation-v1540-IEs ::= SEQUENCE {<br>   :,<br>   nonCriticalExtension    UEAssistanceInformation-v1610-IEs    OPTIONAL<br>}<br>UEAssistanceInformation-v1610-IEs ::= SEQUENCE {<br>   :<br>   nonCriticalExtension    UEAssistanceInformation-v17-IEs    OPTIONAL<br>}<br>UEAssistanceInformation-v17-IEs ::= SEQUENCE { |

| UEAssistanceInformation message |
| --- |
| nonSDT-Data-Indication-r17            NonSDT-Data-Indication-r17    OPTIONAL,<br>nonCriticalExtension                     SEQUENCE { }                    OPTIONAL<br>}<br>NonSDT-Data-Indication -r17 ::=           SEQUENCE {<br>Information such as reason/cause for data arrival, RB ID(s), Data volume etc can be added in this IE.<br>   priorityCause-r17                ENUMERATED {normal, emergency}<br>}<br>Alternate<br>NonSDT-Data-Indication -r17 ::=           SEQUENCE {<br>   resumeCause                      ResumeCause<br>}<br>-- TAG-UEASSISTANCEINFORMATION-STOP<br>-- ASN1STOP |

| UEAssistanceInformation message (Alternate) |
| --- |
| -- ASN1START<br>-- TAG-UEASSISTANCEINFORMATION-START<br>UEAssistanceInformation ::=      SEQUENCE {<br>   criticalExtensions             CHOICE {<br>      ueAssistanceInformation        UEAssistanceInformation-IEs,<br>      criticalExtensionsFuture       SEQUENCE { }<br>   }<br>}<br>UEAssistanceInformation-IEs ::=     SEQUENCE {<br>   :<br>   lateNonCriticalExtension       OCTET STRING               OPTIONAL,<br>   nonCriticalExtension           UEAssistanceInformation-v1540-IEs   OPTIONAL<br>}<br>UEAssistanceInformation-v1540-IEs ::= SEQUENCE {<br>   :,<br>   nonCriticalExtension           UEAssistanceInformation-v1610-IEs   OPTIONAL<br>}<br>UEAssistanceInformation-v1610-IEs ::= SEQUENCE {<br>   :<br>   nonCriticalExtension            UEAssistanceInformation-v17-IEs     OPTIONAL<br>}<br>UEAssistanceInformation-v17-IEs ::= SEQUENCE {<br>   nonSDT-Data-Indication-r17      enum (TRUE),<br>   nonCriticalExtension           SEQUENCE { }                   OPTIONAL<br>}<br>-- TAG-UEASSISTANCEINFORMATION-STOP |

Option 2: A new MAC CE can include this indication. An LCH ID (LCID) is reserved for this new MAC CE and included in MAC subheader of this MAC CE.

This MAC CE is transmitted in UL grant received during the SDT procedure.

The priority of this new MAC CE can be as follows: Logical channels shall be prioritized in accordance with the following order (highest priority listed first):

- C-RNTI MAC CE or data from UL-CCCH;
- MAC CE for non SDT DRB indication;
- Configured Grant Confirmation MAC CE or beam failure recovery (BFR) MAC CE or Multiple Entry Configured Grant Confirmation MAC CE;
- Sidelink (SL) Configured Grant Confirmation MAC CE;
- Listen before talk (LBT) failure MAC CE;
- MAC CE for prioritized SL-BSR;
- MAC CE for BSR, with exception of BSR included for padding;
- Single Entry power headroom report (PHR) MAC CE or Multiple Entry PHR MAC CE;
- MAC CE for the number of Desired Guard Symbols;
- MAC CE for Pre-emptive BSR;
- MAC CE for SL-BSR, with exception of prioritized SL-BSR and SL-BSR included for padding;
- Data from any Logical Channel, except data from UL-CCCH;
- MAC CE for Recommended bit rate query;
- MAC CE for BSR included for padding; and
- MAC CE for SL-BSR included for padding.

(Alternate) Logical channels shall be prioritized in accordance with the following order (highest priority listed first):

- C-RNTI MAC CE or data from UL-CCCH;
- Configured Grant Confirmation MAC CE or BFR MAC CE or Multiple Entry Configured Grant Confirmation MAC CE;
- Sidelink Configured Grant Confirmation MAC CE;
- LBT failure MAC CE;
- MAC CE for prioritized SL-BSR;
- MAC CE for BSR, with exception of BSR included for padding;
- MAC CE for non SDT DRB indication;
- Single Entry PHR MAC CE or Multiple Entry PHR MAC CE;
- MAC CE for the number of Desired Guard Symbols;

MAC CE for Pre-emptive BSR;
MAC CE for SL-BSR, with exception of prioritized SL-BSR prioritized and SL-BSR included for padding;
data from any Logical Channel, except data from UL-CCCH;
MAC CE for Recommended bit rate query;
MAC CE for BSR included for padding; and
MAC CE for SL-BSR included for padding.

(Alternate) Logical channels shall be prioritized in accordance with the following order (highest priority listed first):
C-RNTI MAC CE or data from UL-CCCH;
Configured Grant Confirmation MAC CE or BFR MAC CE or Multiple Entry Configured Grant Confirmation MAC CE;
Sidelink Configured Grant Confirmation MAC CE;
LBT failure MAC CE;
MAC CE for prioritized SL-BSR;
MAC CE for BSR, with exception of BSR included for padding;
Single Entry PHR MAC CE or Multiple Entry PHR MAC CE;
MAC CE for the number of Desired Guard Symbols;
MAC CE for Pre-emptive BSR;
MAC CE for SL-BSR, with exception of prioritized SL-BSR and SL-BSR included for padding;
data from any Logical Channel, except data from UL-CCCH;
MAC CE for non SDT DRB indication;
MAC CE for Recommended bit rate query;
MAC CE for BSR included for padding; and
MAC CE for SL-BSR included for padding.

(Alternate) Logical channels shall be prioritized in accordance with the following order (highest priority listed first):
MAC CE for non SDT DRB indication;
C-RNTI MAC CE or data from UL-CCCH;
Configured Grant Confirmation MAC CE or BFR MAC CE or Multiple Entry Configured Grant Confirmation MAC CE;
Sidelink Configured Grant Confirmation MAC CE;
LBT failure MAC CE;
MAC CE for prioritized SL-BSR;
MAC CE for BSR, with exception of BSR included for padding;
Single Entry PHR MAC CE or Multiple Entry PHR MAC CE;
MAC CE for the number of Desired Guard Symbols;
MAC CE for Pre-emptive BSR;
MAC CE for SL-BSR, with exception of prioritized SL-BSR and SL-BSR included for padding;
data from any Logical Channel, except data from UL-CCCH;
MAC CE for Recommended bit rate query;
MAC CE for BSR included for padding; and
MAC CE for SL-BSR included for padding.

Alternately, the MAC CE used to provide assistance information to the gNB during SDT procedure can include this indication.

In an embodiment, UE may trigger RA to request UL grant for this new MAC CE or RRC message.

Upon receiving the indication (new MAC CE or RRC message for informing availability of data for non SDT RB(s)) about the availability of data for non SDT DRB(s), gNB may resume the RRC connection by sending RRCResume to UE. In an alternate embodiment, gNB may send RRCRelease to terminate the SDT procedure and UE then initiate RRC connection resume procedure (connection resume procedure details as explained earlier) after termination of SDT procedure. In an alternate embodiment, upon receiving indication (new MAC CE or RRC message for informing availability of data for non SDT RB(s)) about the data arrival in non SDT RB(s), gNB knows about the availability of data of non SDT DRB (or RB) and may resume the RRC connection by sending RRCResume to UE or indicate (indication can be sent in signaling message or MAC CE or DCI) UE to consider non SDT RB(s) as SDT RB(s). UE resumes these RBs and transmits data from these RBs during the ongoing SDT procedure at operation 650.

In an embodiment, In the UL grant received during the SDT procedure, UE may multiplex data from both SDT and non SDT LCHs. If data is available for both SDT and non SDT LCH, UE may first prioritize SDT LCH(s) wherein data is included from SDT LCHs according to LCP procedure. If resources remain after including data from SDT LCH, UE may include data from non SDT LCHs. In an embodiment, in the UL grant received during the SDT procedure, UE may multiplex data from both SDT and non SDT LCHs, if indicated by network. Otherwise not. Whether to multiplex non SDT LCHs in the UL grant during the SDT procedure or not, can be indicated by gNB in RRCReconfiguration message or RRCRelease message or in system information or in another signaling message (e.g., DCI, MAC CE, etc.).

(Alternate) In an alternate embodiment, In the UL grant received during the SDT procedure, UE may multiplex data from both SDT and non SDT LCHs according to LCP procedure. In an embodiment, in the UL grant received during the SDT procedure, UE may multiplex data from both SDT and non SDT LCHs, if indicated by network. Otherwise not. Whether to multiplex non SDT LCHs in the UL grant during the SDT procedure or not, can be indicated by gNB in RRCReconfiguration message or RRCRelease message or in system information or in another signaling message (e.g., DCI, MAC CE, etc.).

(Alternate) In an alternate embodiment, In the UL grant received during the SDT procedure, UE multiplexes data from SDT LCHs according to LCP procedure. Data from non SDT LCHs are not included in the UL grant.

UE continue SDT procedure at operation 650 until the SDT procedure is terminated/completed. SDT procedure is completed/terminated if SDT timer is expired or UE receives RRCRelease message from gNB or UE receives RRCResume message from gNB or UE receives RRCSetup message from gNB or UE receives RRCReject message from gNB or UE receives indication/MAC CE from gNB to terminate SDT procedure.

Figure 7:
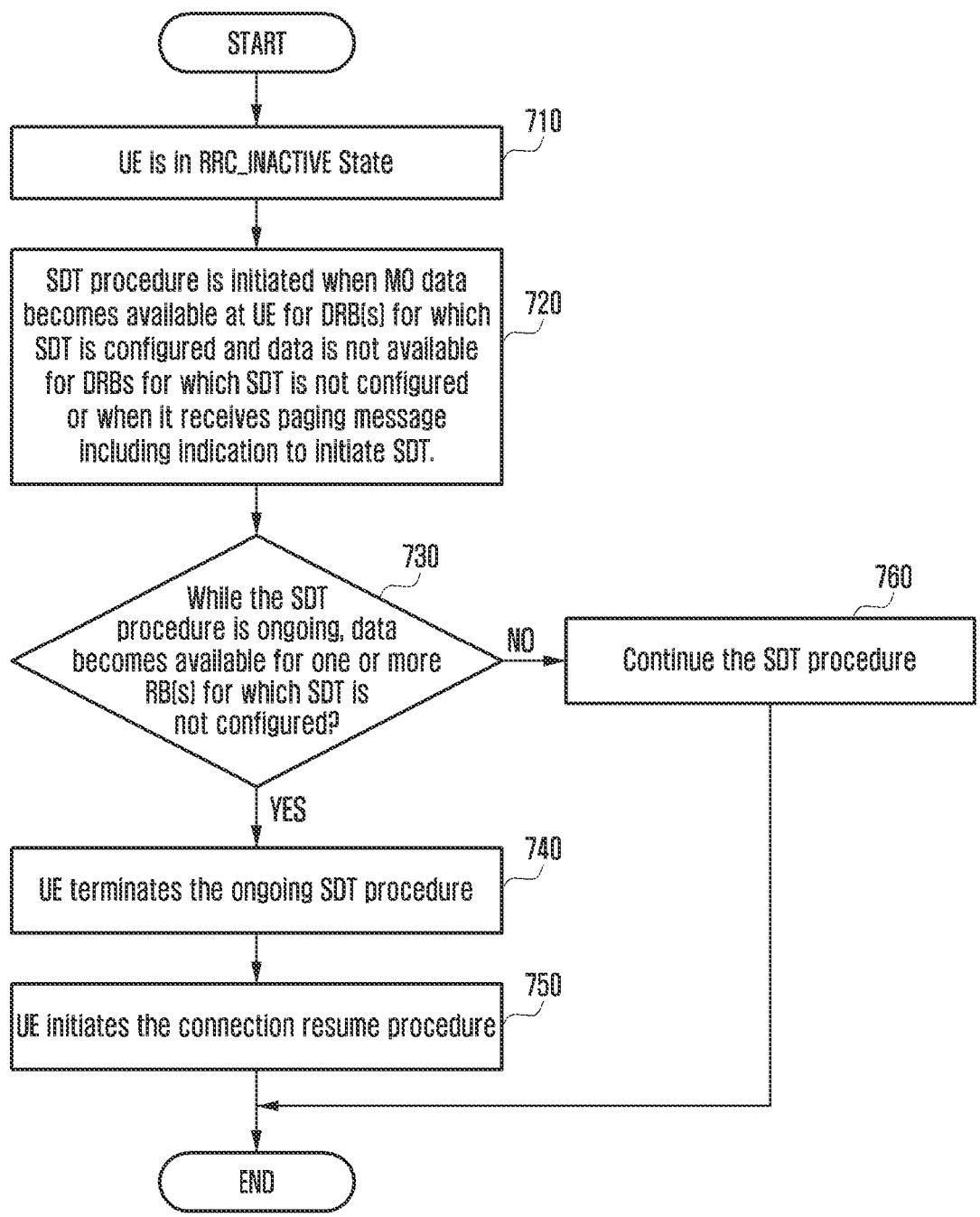

Embodiment 4: FIG. 7 illustrates the operation of UE in an embodiment of this disclosure for handling non SDT DRB during the SDT procedure.

UE is in RRC_INACTIVE state at operation 1010. Network (i.e., gNB) has signaled to UE the DRB(s) for which SDT is enabled/configured/allowed. The signaling can be RRCReconfiguration message or RRC release message. In an alternate embodiment, gNB has signaled to UE the RB(s) (i.e., DRB(s) and/or SRBs) for which SDT is enabled/configured/allowed.

SDT procedure is initiated by UE when MO data becomes available at UE for DRB(s) for which SDT is configured/allowed/enabled and data is not available for DRBs for which SDT is not configured/allowed/enabled and other criteria (e.g., sum of data volume in all RB(s) for which SDT is configured/enabled/allowed is less than (or less than equal to) SDT data threshold, DL RSRP is greater than (or greater than equal to) RSRP threshold) to initiate SDT is met at operation 1020 or SDT procedure is initiated by UE when it receives paging message including indication to initiate SDT. In an alternate embodiment, SDT procedure is initiated by UE when MO data (can be user data or signaling data) becomes available at UE for RB(s) (i.e., DRB(s) and/or SRBs) for which SDT is configured/allowed/enabled and data is not available for RBs for which SDT is not configured/allowed/enabled and other criteria (e.g., sum of data volume in all RB(s) for which SDT is configured/enabled/allowed is less than (or less than equal to) SDT data threshold, DL RSRP is greater than (or greater than equal to) RSRP threshold, SDT resource validity, etc.) to initiate SDT is met. The UE sends an RRCResumeRequest/RRCResumeRequest1 to the gNB on SRB 0. It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token. The UE shall calculate it using the integrity algorithm (NIA or EIA) in the stored AS security context, which was negotiated between the UE and the last serving gNB and the $K_{RRCint}$ from the stored AS security context.

Upon initiation of SDT procedure, UE starts a timer for SDT. This timer can also be referred as SDT failure detection timer. Note that timer for SDT is different from the timer T319 which UE starts when it initiates RRC connection resume procedure. The value of timer is configured/signaled by gNB in system information of camped cell or in RRCRelease message or in RRCReconfiguration message. If not signaled, UE can use default value of timer for SDT. The default value of timer for SDT can be pre-defined. Note that upon initiation of SDT, UE resumes SRB1, UE resumes SRB 2 if SDT is allowed/enabled/configured for SRB2 and/or UE resumes DRB(s) for which SDT is allowed/enabled/configured, UE derive security keys and transmit RRCResumeRequest/RRCResumeRequest as explained earlier. SDT procedure is completed/terminated if this timer is expired or UE receives RRCRelease message from gNB or UE receives RRCResume message from gNB or UE receives RRCSetup message from gNB or UE receives RRCReject message from gNB or UE receives indication/MAC CE from gNB to terminate SDT procedure. Note that timer is stopped when the SDT procedure is completed or terminated. If UE receives RRCRelease including suspend configuration, SDT procedure/session is considered completed; UE stops the SDT timer; UE stores the current (i.e. those derived when SDT procedure was initiated) KRRCint key and current KgNB key; UE deletes KRRCenc, KUPint, KUPenc keys; UE stores the C-RNTI and PCI/cell identity of the cell from which UE has received RRCRelease message and UE stores the NCC received in RRC Release message. If UE receives RRCRelease without suspend configuration or UE receives RRCReject, SDT procedure/session is considered completed; UE stops the SDT timer; UE enters RRC_IDLE; UE delete all the derived security keys and stored AS context.

While the SDT procedure is ongoing (in other words while the SDT timer is running), the UE identifies whether data becomes available for one or more RB(s) for which SDT is not configured/allowed/enabled at operation 1030. While the SDT procedure is ongoing, if data becomes available for one or more DRBs for which SDT is not configured/allowed/enabled (or if data becomes available for one or more RBs for which SDT is not configured/allowed/enabled), UE may perform the following operation; or (Alternate) While the SDT procedure is ongoing (in other words while the SDT timer is running), if data becomes available for one or more RBs for which SDT is not configured and if cumulative volume of data for non SDT RBs is greater than threshold, where threshold is configured to UE by gNB in RRCRelease message or in RRCReconfiguration message or system information or another signaling message, UE may perform the following operation; or (Alternate) While the SDT procedure is ongoing (in other words while the SDT timer is running), if data becomes available for one or more RBs for which SDT is not configured and if LCH priority of non SDT RB for which data arrives is greater than highest LCH priority of all SDT RBs, UE may perform the following operation; or (Alternate) While the SDT procedure is ongoing (in other words while the SDT timer is running), if data arrives for non SDT SRB or if cumulative volume of data for non SDT DRBs is greater than threshold, where threshold is configured to UE by gNB in RRCRelease message or in RRCReconfiguration message or system information or another signaling message, UE may perform the following operation:

UE terminates the ongoing SDT procedure at operation 740. Stop the SDT timer. In an embodiment, upon termination of SDT procedure, UE discard the security keys ($K_{gNB}$ key, $K_{RRCenc}$ key, the $K_{RRCint}$ key, the $K_{UPint}$ key and the $K_{UPenc}$) which were derived upon initiation of SDT procedure.

UE initiates the connection resume procedure at operation 750. As explained earlier upon initiating the RRC connection resume procedure UE:

apply the default L1 (layer 1 or physical layer) parameter values as specified in corresponding physical layer specifications, except for the parameters for which values are provided in SIB1; apply the default MAC Cell Group configuration; apply the CCCH (common control channel) configuration; start timer T319; apply the timeAlignmentTimerCommon included in SIB1; apply the default SRB1 configuration; set the variable pendingRNA-Update to false; initiate transmission of the RRCResumeRequest message or RRCResumeRequest1; restore the RRC configuration, RoHC state, the stored QoS flow to DRB mapping rules and the KgNB and KRRCint keys from the stored UE Inactive AS context except for the following: masterCellGroup, mrdc-S econdaryCellGroup, if stored; and pdcp-Config;

UE set the resumeMAC-I to the 16 least significant bits of the MAC-I calculated: with the $K_{RRCint}$ key in the UE Inactive AS Context and the previously configured integrity protection algorithm; and with at least one of input bits for COUNT, BEARER and DIRECTION set to non-binary ones (e.g. set to 2 or any value other than 1) and others to binary ones (i.e. 1) and message set to VarResumeMAC-Input (source PCI i.e. PCI in stored AS context, target Cell-ID i.e. cellIdentity of the first PLMN-Identity included in the PLMN-IdentityInfoList broadcasted in SIB1 of the cell to which UE is sending resume request, source C-RNTI i.e. C-RNTI in stored AS context). Alternately, UE set the resumeMAC-I to the 16 least significant bits of the MAC-I calculated: with the $K_{RRCint}$ key in the UE Inactive AS Context and the previously configured integrity protection algorithm; and with at least one of input bits for COUNT, BEARER and DIRECTION set to binary ones and message set to VarResumeMAC-Input (source PCI i.e. PCI in stored AS context, target Cell-ID i.e. cellIdentity of the first PLMN-Identity included in the PLMN-IdentityInfoList broadcasted in SIB1 of the cell to which UE is sending resume request, source C-RNTI i.e. C-RNTI in stored AS context).

UE derive the $K_{gNB}$ key based on the current $K_{gNB}$ key (i.e. $K_{gNB}$ key in stored AS context) or the NH in the UE Inactive AS Context, using the stored nextHopChainingCount value (stored nextHopChainingCount value is the one which is received in last received RRCRelease by UE), where UE derive the $K_{gNB}$ key from $K_{gNB}$ key in stored AS context if stored nextHopChainingCount is same as nextHopChainingCount corresponding to $K_{gNB}$ key in stored AS context, UE derive the $K_{gNB}$ key from NH corresponding to stored nextHopChainingCount value; derive the $K_{RRCenc}$ key, the $K_{RRCint}$ key, the $K_{UPint}$ key and the $K_{UPenc}$ key; configure lower layers to apply integrity protection for all signaling radio bearers except SRB0 using the configured algorithm and the $K_{RRCint}$ key and $K_{UPint}$ key, i.e., integrity protection shall be applied to all subsequent messages received and sent by the UE; configure lower layers to apply ciphering for all signaling radio bearers except SRB0 and to apply the configured ciphering algorithm, the $K_{RRCenc}$ key and the $K_{UPenc}$ key derived, i.e. the ciphering configuration shall be applied to all subsequent messages received and sent by the UE; re-establish PDCP entities for SRB1; resume SRB1; transmit RRCResumeRequest or RRCResumeRequest1. If field useFullResumeID is signalled in SIB1: UE select RRCResumeRequest1 as the message to use; set the resumeIdentity to the stored fullI-RNTI value; if field useFullResumeID is not signalled in SIB1: UE select RCResumeRequest as the message to use; set the resumeIdentity to the stored shortI-RNTI value. The RRCResumeRequest or RRCResumeRequest1 is transmitted on SRB 0. The logical channel for RRCResumeRequest is CCCH (or CCCH0) i.e. in MAC PDU, LCID corresponding to CCCH is added in MAC subheader of MAC SDU carrying RRCResumeReqeust. The logical channel for RRCResumeRequest1 is CCCH1 i.e. in MAC PDU, LCID corresponding to CCCH is added in MAC subheader of MAC SDU carrying RRCResumeReqeust. RLC transparent mode (i.e. no RLC header is added to RRC message) is used for transmitting RRCResumeRequest or RRCResumeRequest1 message. RRCResumeReqeust/RRCResumeRequest1 includes resumeIdentity, resumeCause and resumeMAC-I. In an embodiment, new messages RRCResumeRequestX or RRCResumeRequestY can be defined. RRCResumeRequestX having same information as RRCResumeReqeust. RRCResumeRequestY having same information as RRCResumeReqeust1. If gNB receives RRCResumeRequestX or RRCResumeRequestY, it comes to know that UE is initiating this RRC connection resume procedure after terminating the ongoing SDT procedure due to non SDT RB(S) data arrival. In an embodiment, different resumeCause value or a new field can be added RRCResumeRequest or RRCResumeRequest1 so that network can identify that UE is initiating this RRC connection resume procedure after terminating the ongoing SDT procedure due to non SDT RB(S) data arrival In an embodiment, Upon receiving the RRCResumeRequest/RRCResumeRequest1 RRCResumeRequestX/RRCResumeRequestY, gNB may resume the RRC connection by sending RRCResume to UE.

In an embodiment upon availability of data for non SDT RB(s) during the SDT procedure/session (i.e. while the SDT timer is running), UE can apply the operation of embodiment 4, if the UE has not yet received any response (such as PDCCH addressed to C-RNTI or HARQ feedback or RRC message or RLC ACK) from GNBor if random access procedure initiated for SDT is not yet completed). In an embodiment upon availability of data for non SDT RB(s) during the SDT procedure/session (i.e. while the SDT timer is running), if the UE has received any response (such as PDCCH addressed to C-RNTI or HARQ feedback or RRC message or RLC ACK) from GNB or if random access procedure initiated for SDT is completed UE can apply the operation of embodiment 3.

Figure 8:
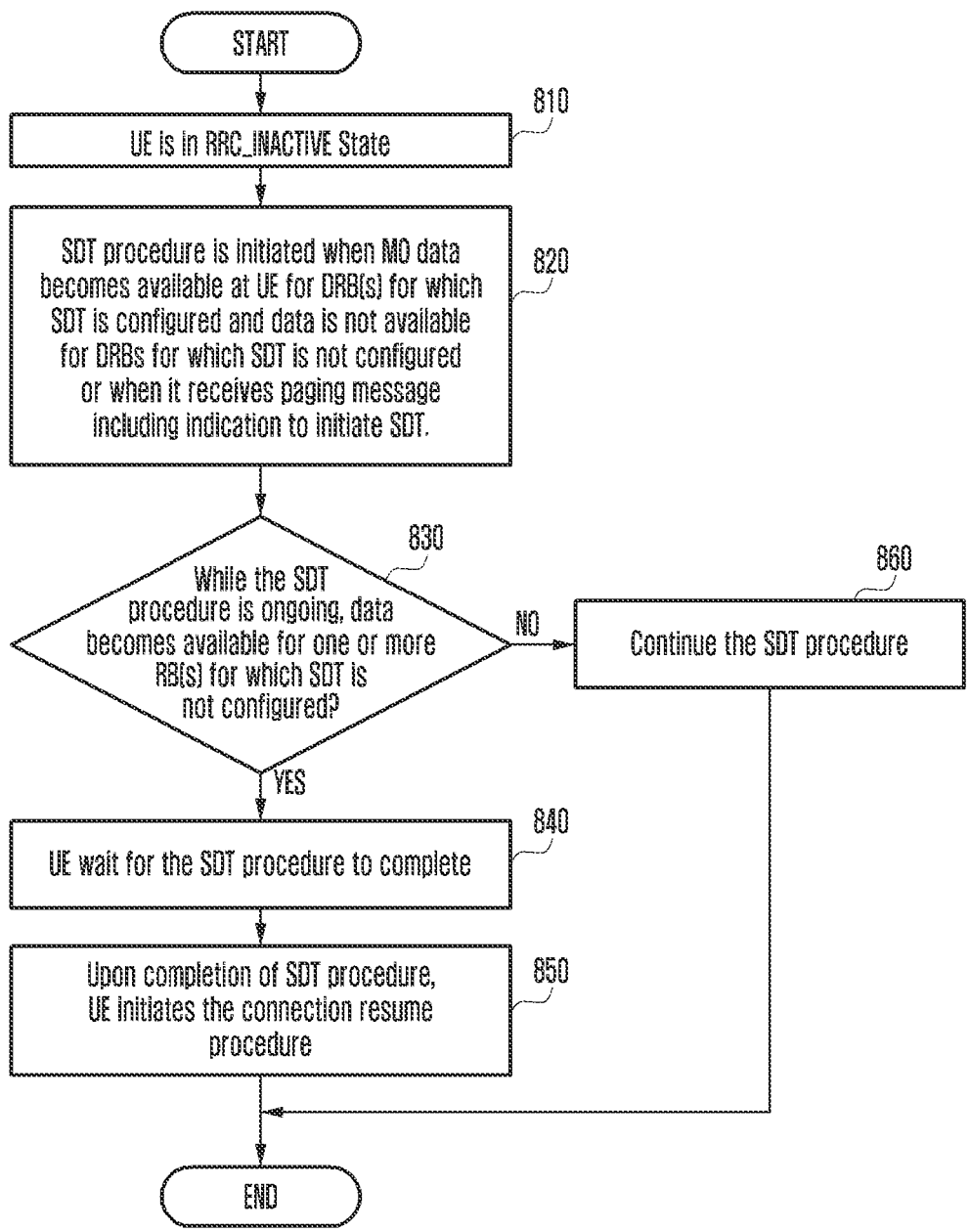

Embodiment 5: FIG. 8 illustrates the operation of UE in an embodiment of this disclosure for handling non SDT DRB during the SDT procedure.

UE is in RRC_INACTIVE state at operation 810. Network has signaled to UE the DRB(s) for which SDT is enabled/allowed/configured. The signaling can be RRCReconfiguration message or RRC release message. In an alternate embodiment, gNB has signaled to UE the RB(s) (i.e., DRB(s) and/or SRBs) for which SDT is enabled/allowed/configured.

SDT procedure is initiated by UE when MO data becomes available at UE for DRB(s) for which SDT is configured/allowed/enabled and data is not available for DRBs for which SDT is not configured/allowed/enabled and other criteria (e.g., sum of data volume in all RB(s) for which SDT is configured/enabled/allowed is less than (or less than equal to) SDT data threshold, DL RSRP is greater than (or greater than equal to) RSRP threshold) to initiate SDT is met at operation 820 or SDT procedure is initiated by UE when it receives paging message including indication to initiate SDT. In an alternate embodiment, SDT procedure is initiated by UE when MO data (can be user data or signaling data) becomes available at UE for RB(s) (i.e., DRB(s) and/or SRBs) for which SDT is configured/allowed/enabled and data is not available for RBs for which SDT is not configured/allowed/enabled and other criteria (e.g., SDT data threshold, RSRP threshold, SDT resource validity, etc.) to initiate SDT is met.

The UE sends an RRCResumeRequest/RRCResumeRequest1 to the gNB on SRB 0. It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token. The UE shall calculate it using the integrity algorithm (NIA or EIA) in the stored AS security context, which was negotiated between the UE and the last serving gNB and the $K_{RRCint}$ from the stored AS security context.

Upon initiation of SDT procedure, UE starts a timer for SDT. This timer can also be referred as SDT failure detection timer. Note that timer for SDT is different from the timer T319 which UE starts when it initiates RRC connection resume procedure. The value of timer is configured/signaled by gNB in system information of camped cell or in RRCRelease message or in RRCReconfiguration message. If not signaled, UE can use default value of timer for SDT. The default value of timer for SDT can be pre-defined. Note that upon initiation of SDT, UE resumes SRB1, UE resumes SRB 2 if SDT is allowed/enabled/configured for SRB2 and/or UE resumes DRB(s) for which SDT is allowed/enabled/configured, UE derive security keys and transmit RRCResumeRequest/RRCResumeRequest as explained earlier. SDT procedure is completed/terminated if this timer is expired or UE receives RRCRelease message from gNB or UE receives RRCResume message from gNB or UE receives RRCSetup message from gNB or UE receives RRCReject message from gNB or UE receives indication/MAC CE from gNB to terminate SDT procedure. Note that timer is stopped when the SDT procedure is completed or terminated.

While the SDT procedure is ongoing, the UE identifies whether data becomes available for one or more RB(s) for which SDT is not configured/allowed/enabled at operation 830. While the SDT procedure is ongoing, if data becomes available for one or more DRBs for which SDT is not configured/allowed/enabled (or if data becomes available for one or more RBs for which SDT is not configured/allowed/enabled), UE may perform the following operation; or (Alternate) While the SDT procedure is ongoing (in other words while the SDT timer is running), if data becomes available for one or more RBs for which SDT is not configured and if cumulative volume of data for non SDT RBs is greater than threshold, where threshold is configured to UE by gNB in RRCRelease message or in RRCReconfiguration message or system information or another signaling message, UE may perform the following operation; or (Alternate) While the SDT procedure is ongoing (in other words while the SDT timer is running), if data becomes available for one or more RBs for which SDT is not configured and if LCH priority of non SDT RB for which data arrives is greater than highest LCH priority of all SDT RBs, UE may perform the following operation; or (Alternate) While the SDT procedure is ongoing (in other words while the SDT timer is running), if data arrives for non SDT SRB or if cumulative volume of data for non SDT DRBs is greater than threshold, where threshold is configured to UE by gNB in RRCRelease message or in RRCReconfiguration message or system information or another signaling message, UE may perform the following operation:

UE waits for the SDT procedure to complete/terminate at operation 840.

Upon completion of SDT procedure, UE initiates the connection resume procedure at operation 850. The details of connection resume procedure are explained earlier.

UE continue SDT procedure at operation 860 until the SDT procedure is terminated/completed. SDT procedure is completed/terminated if SDT timer is expired or UE receives RRCRelease message from gNB or UE receives RRCResume message from gNB or UE receives RRCSetup message from gNB or UE receives RRCReject message from gNB or UE receives indication/MAC CE from gNB to terminate SDT procedure.

Figure 9:
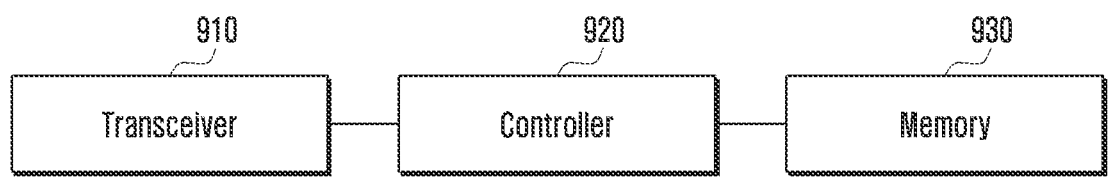
FIG. 9 is a block diagram of a terminal according to an embodiment of the disclosure.

FIG. 9 is a block diagram of a terminal according to an embodiment of the disclosure.

Referring to FIG. 9, a terminal includes a transceiver 910, a controller 920 and a memory 930. The controller 920 may refer to a circuitry, an application-specific integrated circuit (ASIC), a field programmable gate array (FPGA), or at least one processor. The transceiver 910, the controller 920, and the memory 930 are configured to perform the operations of the UE illustrated elsewhere in the figures, e.g., FIGS. 1 to 8, or as otherwise described above. Although the transceiver 910, the controller 920, and the memory 930 are shown as separate entities, they may be integrated onto a single chip. The transceiver 910, the controller 920, and the memory 930 may also be electrically connected to or coupled with each other.

The transceiver 910 may transmit and receive signals to and from other network entities, e.g., a base station or another terminal.

The controller 920 may control the UE to perform functions according to the embodiments described above.

In an embodiment, the operations of the terminal may be implemented using the memory 930 storing corresponding program codes. Specifically, the terminal may be equipped with the memory 930 to store program codes implementing desired operations. To perform the desired operations, the controller 920 may read and execute the program codes stored in the memory 930 by using a processor or a central processing unit (CPU).

Figure 10:
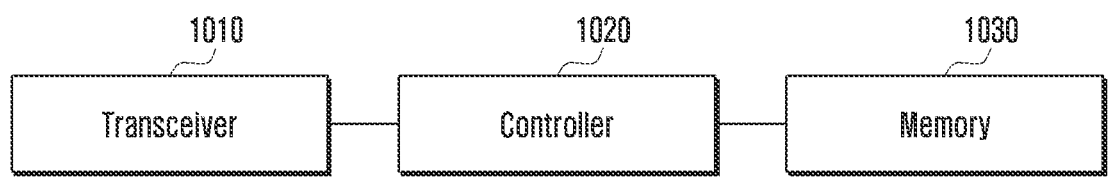
FIG. 10 is a block diagram of a base station according to an embodiment of the disclosure.

FIG. 10 is a block diagram of a base station according to an embodiment of the disclosure.

Referring to FIG. 10, a base station includes a transceiver 1010, a controller 1020, and a memory 1030. The controller 1020 may refer to a circuitry, an ASIC, an FPGA, or at least one processor. The transceiver 1010, the controller 1020, and the memory 1030 are configured to perform the operations of the gNB illustrated elsewhere in the figures, or as otherwise described above. Although the transceiver 1010, the controller 1020, and the memory 1030 are shown as separate entities, they may be integrated onto a single chip. The transceiver 1010, the controller 1020, and the memory 1030 may also be electrically connected to or coupled with each other.

The transceiver 1010 may transmit and receive signals to and from other network entities, e.g., a terminal.

The controller 1020 may control the gNB to perform functions according to the embodiments described above.

In an embodiment, the operations of the base station may be implemented using the memory 1030 storing corresponding program codes. Specifically, the base station may be equipped with the memory 1030 to store program codes implementing desired operations. To perform the desired operations, the controller 1020 may read and execute the program codes stored in the memory 1030 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a terminal in a communication system, the method comprising:
    initiating a small data transmission (SDT) procedure in a radio resource control (RRC) inactive state;
    identifying that data for at least one radio bearer for which SDT is not configured is available, while the SDT procedure is ongoing; and
    transmitting, to a base station, an RRC message including an indication, wherein the indication indicates an arrival of the data for the at least one radio bearer for which the SDT is not configured while the SDT procedure is ongoing, and
    wherein the RRC message is integrity protected and encrypted, and is transmitted based on a dedicated control channel (DCCH) and a signaling radio bearer 1 (SRB1).

2. The method of claim 1, further comprising:
    receiving, from the base station, an RRC release message including a nextHopChainingCount, wherein
    the nextHopChainingCount is used for encryption and integrity protection of the RRC message.

3. The method of claim 1, further comprising:
receiving, from the base station, an RRC resume message for transitioning the terminal to an RRC connected state, as a response to transmitting the RRC message.

4. The method of claim 1,
wherein the RRC message is a user equipment (UE) assistance information message,
wherein the UE assistance information message further includes information on a resume cause, and
wherein the UE assistance information message is transmitted, in case that the terminal did not transmit the UE assistance information message with an indication after the SDT procedure is initiated.

5. A method performed by a base station in a communication system, the method comprising:
receiving, from a terminal, a common control channel (CCCH) message based on a small data transmission (SDT) procedure initiated by the terminal in a radio resource control (RRC) inactive state; and
receiving, from the terminal, an RRC message including an indication, wherein the indication indicates an arrival of data for at least one radio bearer for which SDT is not configured while the SDT procedure is ongoing, and
wherein the RRC message which is integrity protected and encrypted is received based on a dedicated control channel (DCCH) and a signaling radio bearer 1 (SRB1).

6. The method of claim 5, further comprising:
transmitting, to the terminal, an RRC release message including a nextHopChainingCount, wherein the nextHopChainingCount is used for encryption and integrity protection of the RRC message.

7. The method of claim 5, further comprising:
transmitting, to the terminal, an RRC resume message for transitioning the terminal to an RRC connected state, as a response to receiving the RRC message.

8. The method of claim 5,
wherein the RRC message is a user equipment (UE) assistance information message, and
wherein the UE assistance information message further includes information on a resume cause.

9. A terminal in a communication system, the terminal comprising:
a transceiver; and
a controller configured to:
initiate a small data transmission (SDT) procedure in a radio resource control (RRC) inactive state,
identify that data for at least one radio bearer for which SDT is not configured is available, while the SDT procedure is ongoing, and
transmit, to a base station via the transceiver, an RRC message including an indication, wherein the indication indicates an arrival of the data for the at least one radio bearer for which the SDT is not configured while the SDT procedure is ongoing, and
wherein the RRC message is integrity protected and encrypted, and is transmitted based on a dedicated control channel (DCCH) and a signaling radio bearer 1 (SRB1).

10. The terminal of claim 9,
wherein the controller is further configured to receive, from the base station via the transceiver, an RRC release message including a nextHopChainingCount, and
wherein the nextHopChainingCount is used for encryption and integrity protection of the RRC message.

11. The terminal of claim 9, wherein the controller is further configured to receive, from the base station via the transceiver, an RRC resume message for transitioning the terminal to an RRC connected state, as a response to transmitting the RRC message.

12. The terminal of claim 9,
wherein the RRC message is a user equipment (UE) assistance information message,
wherein the UE assistance information message further includes information on a resume cause, and
wherein the UE assistance information message is transmitted, in case that the terminal did not transmit the UE assistance information message with an indication after the SDT procedure is initiated.

13. A base station in a communication system, the base station comprising:
a transceiver; and
a controller configured to:
receive, from a terminal via the transceiver, a common control channel (CCCH) message based on a small data transmission (SDT) procedure initiated by the terminal in a radio resource control (RRC) inactive state, and
receive, from the terminal via the transceiver, an RRC message including an indication, wherein the indication indicates an arrival of data for at least one radio bearer for which SDT is not configured while the SDT procedure is ongoing, and
wherein the RRC message which is integrity protected and encrypted is received based on a dedicated control channel (DCCH) and a signaling radio bearer 1 (SRB1).

14. The base station of claim 13,
wherein the controller is further configured to transmit, to the terminal via the transceiver, an RRC release message including a nextHopChainingCount,
wherein the nextHopChainingCount is used for encryption and integrity protection of the RRC message, and
wherein the controller is further configured to transmit, to the terminal via the transceiver, an RRC resume message for transitioning the terminal to an RRC connected state, as a response to receiving the RRC message.

15. The base station of claim 13,
wherein the RRC message is a user equipment (UE) assistance information message, and
wherein the UE assistance information message further includes information on a resume cause.

* * * * *